US011297772B2

(12) United States Patent
Hanson et al.

(10) Patent No.: US 11,297,772 B2
(45) Date of Patent: *Apr. 12, 2022

(54) LED GROW LIGHT SYSTEM

(71) Applicant: Spectra Harvest Lighting, LLC, Roselle, IL (US)

(72) Inventors: James Jeffrey Hanson, Elgin, IL (US); Ricky Joe Sullivan McIntosh, Altoona, IA (US)

(73) Assignee: Spectra Harvest Lighting, LLC, Roselle, IL (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/020,442

(22) Filed: Sep. 14, 2020

(65) Prior Publication Data

US 2020/0404856 A1 Dec. 31, 2020

Related U.S. Application Data

(63) Continuation-in-part of application No. 16/213,153, filed on Dec. 7, 2018, now Pat. No. 10,772,260, (Continued)

(51) Int. Cl.
*A01G 2/00* (2018.01)
*A01G 7/04* (2006.01)
(Continued)

(52) U.S. Cl.
CPC ............... *A01G 2/00* (2018.02); *A01G 7/045* (2013.01); *F21K 9/00* (2013.01); *F21V 29/67* (2015.01);
(Continued)

(58) Field of Classification Search
CPC ........ H05B 45/50; H05B 45/52; H05B 45/54; H05B 45/58; A01G 7/045
See application file for complete search history.

(56) References Cited

U.S. PATENT DOCUMENTS 2,295,863 A 9/1942 Paradis
4,654,629 A 3/1987 Bezos et al.
(Continued)

FOREIGN PATENT DOCUMENTS

EP 1887836 A2 2/2008
WO 2007138505 A1 12/2007
(Continued)

OTHER PUBLICATIONS

'Growing Towards the Light', by Publitek European Editors, Digi-Key Corp., Jul. 3, 2012; available at http://www.digikey.com/en/articles/techzone/2012/jul/growing-towards-the-light.
(Continued)

*Primary Examiner* — Alexander K Garlen
*Assistant Examiner* — Colin J Cattanach
(74) *Attorney, Agent, or Firm* — Banner & Witcoff, Ltd.

(57) ABSTRACT

A grow light system for growing plants. The grow light system can have a carrier board assembly containing a plurality of apertures and a plurality of LED modules and secondary LED modules removably engaged with the carrier board in the apertures and forming a gap between LED module and the carrier board. The grow light system can be configured to draw air through the gap over the LEDs and along the heat sink fin to reduce the temperature of the LED module. A plurality of the LED modules can be connected in series and the carrier board can include a dedicated receptacle for a single LED module that is not connected in series with the remaining LED modules.

20 Claims, 17 Drawing Sheets

Related U.S. Application Data which is a continuation of application No. 14/575,543, filed on Dec. 18, 2014, now Pat. No. 10,149,439.

(51) Int. Cl.

| | | |
|---|---|---|
| F21V 29/67 | (2015.01) | |
| F21K 9/00 | (2016.01) | |
| F21V 29/76 | (2015.01) | |
| F21Y 105/12 | (2016.01) | |
| F21Y 105/10 | (2016.01) | |
| F21Y 115/10 | (2016.01) | |
| H05B 45/50 | (2020.01) | |
| H05B 45/00 | (2020.01) | |
| H05B 45/54 | (2020.01) | |
| H05B 45/40 | (2020.01) | |
| H05B 45/52 | (2020.01) | |
| H05B 45/58 | (2020.01) | |

(52) U.S. Cl.
CPC ........... *F21V 29/673* (2015.01); *F21V 29/677* (2015.01); *F21V 29/763* (2015.01); *F21Y 2105/10* (2016.08); *F21Y 2105/12* (2016.08); *F21Y 2115/10* (2016.08); *H05B 45/00* (2020.01); *H05B 45/40* (2020.01); *H05B 45/50* (2020.01); *H05B 45/52* (2020.01); *H05B 45/54* (2020.01); *H05B 45/58* (2020.01); *Y02P 60/14* (2015.11)

(56) References Cited

U.S. PATENT DOCUMENTS

| | | | |
|---|---|---|---|
| 5,278,432 | A | 1/1994 | Ignatius et al. |
| 6,474,838 | B2 | 11/2002 | Fang et al. |
| 6,504,301 | B1 | 1/2003 | Lowery |
| 6,554,450 | B2 | 4/2003 | Fang et al. |
| 6,921,182 | B2 | 7/2005 | Anderson, Jr. et al. |
| 7,038,398 | B1 | 5/2006 | Lys et al. |
| 7,038,399 | B2 | 5/2006 | Lys et al. |
| 7,220,018 | B2 | 5/2007 | Crabb et al. |
| 7,695,163 | B2 | 4/2010 | Yamada et al. |
| 7,961,113 | B2 | 6/2011 | Rabiner et al. |
| 7,975,429 | B2 | 7/2011 | Okabe et al. |
| 7,993,021 | B2 | 8/2011 | Roberts et al. |
| 8,079,735 | B1 | 12/2011 | Vakil et al. |
| 8,232,745 | B2 | 7/2012 | Chemel et al. |
| 8,453,376 | B2 | 6/2013 | Chen et al. |
| 8,468,741 | B2 | 6/2013 | Lewis |
| 8,523,385 | B2 | 9/2013 | Lu et al. |
| 8,559,175 | B2 | 10/2013 | Huisman et al. |
| 8,686,641 | B2 | 4/2014 | Maxik et al. |
| 8,714,774 | B2 | 5/2014 | Dubuc |
| 8,738,160 | B2 | 5/2014 | Bucove et al. |
| 8,987,756 | B2 | 3/2015 | Kim et al. |
| 9,576,786 | B2 | 2/2017 | Greenberg et al. |
| 9,874,343 | B2 | 1/2018 | Dahlen et al. |
| 10,772,260 | B2 * | 9/2020 | Hanson .................... A01G 2/00 |
| 2003/0025518 | A1 | 2/2003 | Berkely |
| 2005/0024877 | A1 | 2/2005 | Frederick |
| 2005/0128743 | A1 | 6/2005 | Chuey et al. |
| 2007/0247847 | A1 | 10/2007 | Villard |
| 2009/0059594 | A1 | 3/2009 | Lin |
| 2009/0251057 | A1 | 10/2009 | Son et al. |
| 2009/0288340 | A1 | 11/2009 | Hess |
| 2010/0020536 | A1 | 1/2010 | Bafetti et al. |
| 2010/0115830 | A1 | 5/2010 | Dube |
| 2010/0135025 | A1 | 6/2010 | Chien et al. |
| 2010/0181579 | A1 | 7/2010 | Chen |
| 2010/0181886 | A1 | 7/2010 | Hsu et al. |
| 2010/0259931 | A1 | 10/2010 | Chemel et al. |
| 2010/0295451 | A1 | 11/2010 | Hsu |
| 2011/0183368 | A1 | 7/2011 | Chapman et al. |
| 2011/0198068 | A1 | 8/2011 | Chen |
| 2011/0209400 | A1 | 9/2011 | Rooymans |
| 2011/0285295 | A1 | 11/2011 | Son et al. |
| 2012/0020071 | A1 | 1/2012 | Mckenzie |
| 2012/0043907 | A1 | 2/2012 | Lu et al. |
| 2012/0099305 | A1 | 4/2012 | Bucove |
| 2012/0161170 | A1 | 6/2012 | Dubuc et al. |
| 2012/0170264 | A1 | 7/2012 | McKenzie et al. |
| 2012/0326610 | A1 | 12/2012 | Lawyer et al. |
| 2013/0063042 | A1 | 3/2013 | Bora et al. |
| 2013/0077293 | A1 | 3/2013 | Lee et al. |
| 2013/0102076 | A1 | 4/2013 | Licamele et al. |
| 2013/0293156 | A1 | 11/2013 | Wells |
| 2013/0294065 | A1 | 11/2013 | Wells |
| 2013/0314929 | A1 | 11/2013 | Manahan |
| 2013/0328587 | A1 | 12/2013 | Linden et al. |
| 2014/0069007 | A1 | 3/2014 | Chen et al. |
| 2014/0090295 | A1 | 4/2014 | Fambro |
| 2014/0250778 | A1 | 9/2014 | Suntych |
| 2014/0259920 | A1 | 9/2014 | Wilson |
| 2014/0292211 | A1 | 10/2014 | Huang |
| 2015/0009702 | A1 | 1/2015 | Fiederling et al. |
| 2015/0029716 | A1 | 1/2015 | Reynolds |
| 2015/0116997 | A1 | 4/2015 | Tappert et al. |
| 2015/0138770 | A1 | 5/2015 | Kwak et al. |
| 2015/0198321 | A1 | 7/2015 | Druchinin |
| 2015/0289328 | A1 | 10/2015 | Conrad et al. |
| 2016/0018084 | A1 | 1/2016 | Greenberg et al. |
| 2016/0057944 | A1 | 3/2016 | Smits et al. |
| 2017/0094911 | A1 | 4/2017 | Suntych |
| 2017/0105358 | A1 | 4/2017 | Wilson |
| 2017/0241632 | A1* | 8/2017 | Nguyen .................. F21V 29/59 |
| 2017/0257923 | A1 | 9/2017 | Breit |
| 2017/0347532 | A1 | 12/2017 | Suntych |
| 2018/0058674 | A1 | 3/2018 | Reynolds |

FOREIGN PATENT DOCUMENTS

| | | |
|---|---|---|
| WO | 2009141287 A1 | 11/2009 |
| WO | 2012040838 A1 | 4/2012 |
| WO | 2014037860 A1 | 3/2014 |

OTHER PUBLICATIONS

"Igro-Controller Set", Intelligent-Gro LED Intensity Series, website last visited Aug. 27, 2014 at https://www.intelligentgro.com/index.php/store/igro-controller-set/product/37-intelligent-gro-intensity-series-controller-remote-control-set.
Jun. 30, 2017—U.S. Office Action—U.S. Appl. No. 14/575,543.
Apr. 3, 2018—U.S. Office Action—U.S. Appl. No. 14/575,543.
Yano, Akira et al., "Plant Lighting System With Five Wavelength-Band Lighty-Emitting Diodes Providing Photon Flux Density and Mixing Ratio Control", Plant Methods 2012, 8:46; available at http://www.plantmethods.com/content/8/1/46.

* cited by examiner

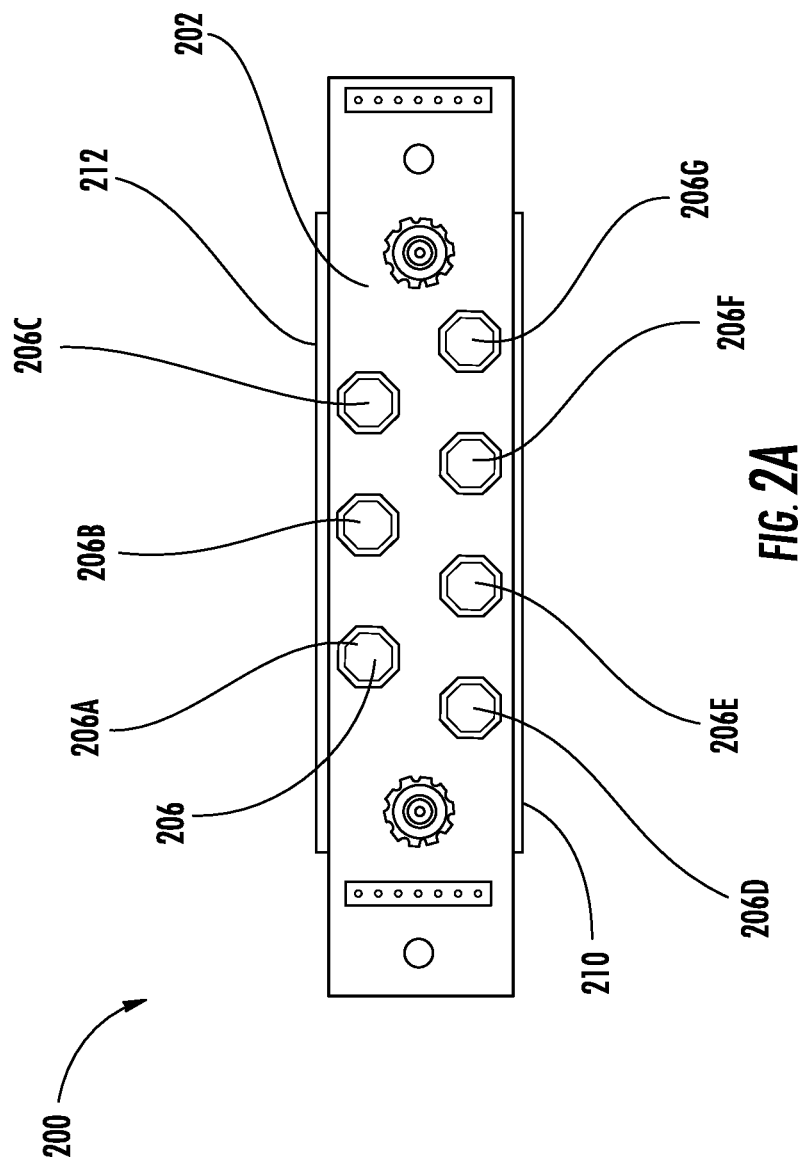

LED GROW LIGHT SYSTEM

CROSS REFERENCE TO RELATED APPLICATIONS

This application is a continuation-in-part of pending U.S. patent application Ser. No. 16/213,153 filed Dec. 7, 2018, which is a continuation of U.S. patent application Ser. No. 14/575,543 filed Dec. 18, 2014. The content of U.S. patent application Ser. No. 16/213,153 and U.S. patent application Ser. No. 14/575,543 is incorporated by reference in its entirety.

TECHNICAL FIELD

Aspects of the disclosure generally relate to systems and methods for grow light systems, and more particularly to systems and methods for LED grow light systems for growing plants.

BACKGROUND

Grow lights are used for horticulture, indoor gardening, hydroponics and many other uses both at the industrial level and at the personal household level. Many types of light bulbs can be used with grow lights, but typically, grow lights use incandescent bulbs, florescent lights, high-intensity discharge lamps, high-pressure sodium (HPS/SON) and metal halide (MH) HID lights. While these lights are effective for growing systems, many disadvantages of these systems exist. For example, many of these lighting systems are inefficient in that much of the energy used to power the systems cannot be effectively converted to light energy and/or the wavelengths of light produced by these lighting systems does not efficiently contribute to plant growth. Additionally, many typical grow light systems emit too much heat which can cause plants to transpire more and as a result increase the amount of water needed to grow the plants.

Recently LED (light emitting diode) technology has been used for grow light systems. LED grow light systems offer many advantages to typical grow light systems in terms of efficiency. For example, LED systems are more efficient than typical grow light systems at converting electrical energy to light energy necessary for plant growth. Additionally, LED grow light systems can utilize the particular wavelengths necessary for plant growth. For example blue light (455 nm-470 nm) can be used to promote vegetative or leaf growth, and red light (620 nam-665 nm) can be used to promote plant flowering. LEDs can also operate at lower temperatures than some typical lighting systems.

While LED lighting systems offer many advantages over typical grow light systems, many disadvantages still exist. A LED grow light system that overcomes the deficiencies of current systems is desired.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure herein relate to grow light systems. In one example, the disclosure provides a grow light system including a housing, a cooling fan, a carrier board assembly defining a plurality of LED module apertures, and at least one LED testing module aperture, and a plurality of LED modules removably engaged with the carrier board assembly in the plurality of LED module apertures and the at least one testing module aperture. Each of the LED modules can include a plurality of LEDs and a heat sink fin. There can be a vertical gap defined between each of the LED modules and the carrier board assembly, a lateral gap defined on either side of each of the LED modules and the carrier board assembly, and a longitudinal gap defined on either side of each of the LED modules and the carrier board assembly. The cooling fan can be configured to draw air into the housing through the vertical gap, lateral gaps, and longitudinal gaps. The LEDs of the plurality of LED modules engaged in the plurality of LED module apertures can be wired in series with each other, and the plurality of LEDs of the LED module engaged in the LED testing module aperture are not wired in series with LEDs of the plurality of LED modules engaged in the plurality of LED module apertures.

In another example, the disclosure provides a grow light system including a housing, a cooling fan, a carrier board assembly defining at least one LED module aperture, and at least one LED module removably engaged with the carrier board assembly in the at least one LED module aperture. The at least one LED module can include at least one LED and a heat sink fin. There can be at least one gap defined between the at least one LED module and the carrier board assembly, and the cooling fan can be configured to draw air into the housing through the at least one gap.

In another example, the disclosure provides a grow light system including a housing, a carrier board assembly defining a plurality of LED module apertures and an LED testing module aperture, a plurality of LED modules removably engaged with the carrier board assembly in the plurality of LED module apertures and in the LED testing module aperture. Each of the plurality of LED modules includes a plurality of LEDs and a heat sink fin. The LEDs of the plurality of LED modules engaged in the plurality of LED module apertures can be wired in series with each other, and the plurality of LEDs of the LED module engaged in the LED testing module aperture are not wired in series with LEDs of the plurality of LED modules engaged in the plurality of LED module apertures.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein:

FIG. 2A is top view of the assembled LED module of FIG. 2.

DETAILED DESCRIPTION

Figure 1:
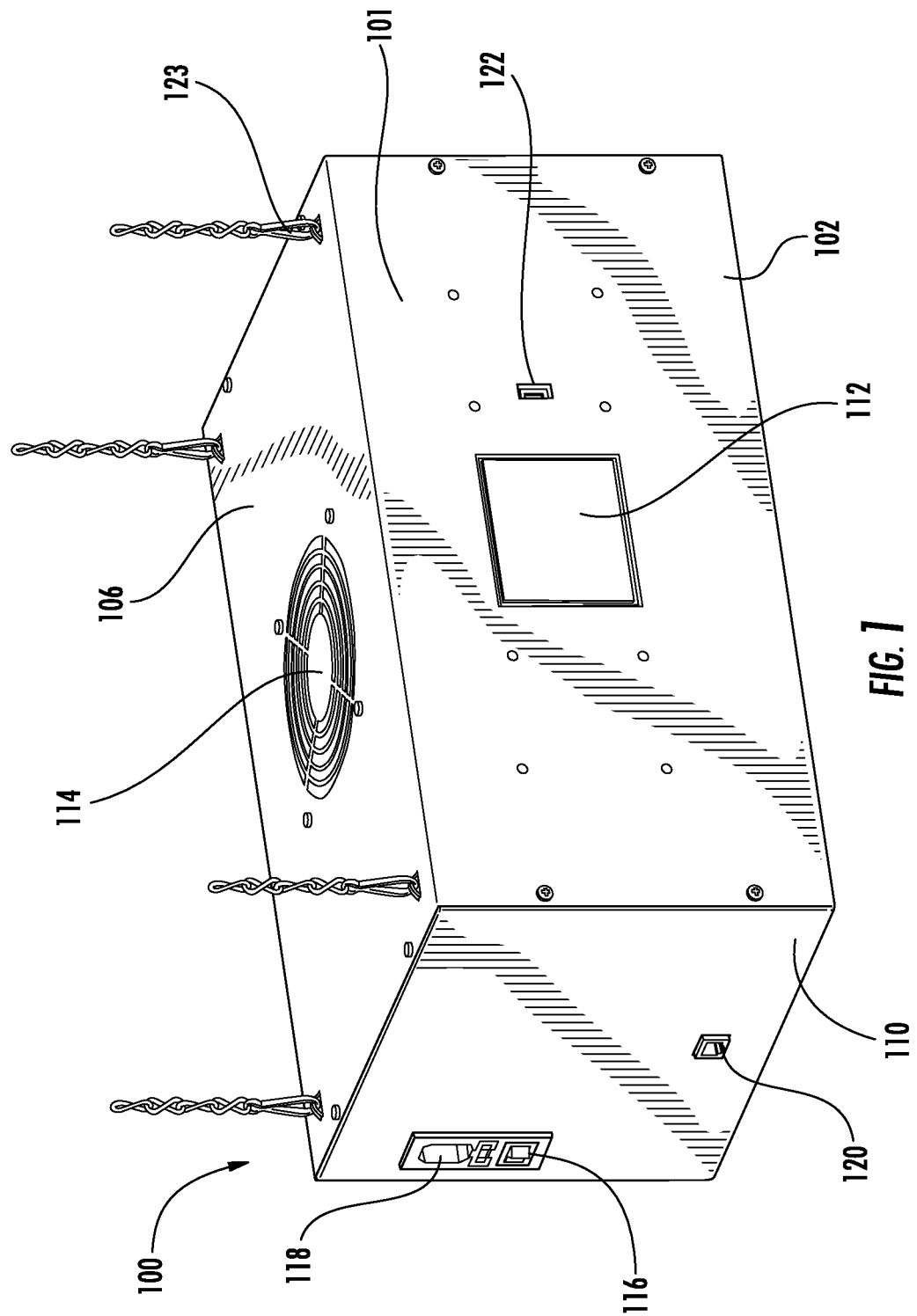
FIG. 1 is a perspective view of a LED lighting system according to aspects of this disclosure.

In the following description of the various embodiments, reference is made to the accompanying drawings, which form a part hereof, and in which is shown by way of illustration, various embodiments of the disclosure that may be practiced. It is to be understood that other embodiments may be utilized.

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this invention. Also, the reader is advised that the attached drawings are not necessarily drawn to scale.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment, or an embodiment combining software and hardware aspects. In addition, aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, USB flash drive, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In general, aspects of this invention relate to grow light systems, and more particularly LED grow light systems. According to various aspects and embodiments, the grow light systems may be formed of one or more of a variety of materials, such as metals (including metal alloys), polymers, and composites, and may be formed in one of a variety of configurations, without departing from the scope of the invention. It is understood that the grow light systems may contain components made of several different materials. Additionally, the components may be formed by various forming methods. For example, metal components, may be formed by forging, molding, casting, stamping, machining, and/or other known techniques. Additionally, polymer components, can be manufactured by polymer processing techniques, such as various molding and casting techniques and/or other known techniques.

The various figures in this application illustrate examples of grow light systems according to this invention. When the same reference number appears in more than one drawing, that reference number is used consistently in this specification and the drawings refer to the same or similar parts throughout.

A grow light system 100 according to aspects of this disclosure is shown in FIG. 1. As shown in FIG. 1, the grow light system 100 can have a housing 101 having a generally rectangular box shape including a front side 102, a back side 104 (not shown), a top side 106, a bottom side (not shown) and two sidewalls 110. Although the housing 101 shown in FIG. 1 is a rectangular box shape, any other suitable housing shapes can be used, such as, a pyramid shape, triangular prism shape, and cylinder shape. The grow light system 100 can also include a user interface 112, and a cooling fan 114. The grow light can also include a power switch 116, a power supply port 118, and as will be described in more detail below, a number of input/output ports 120, 122. The housing 101 can be about 16 inches long or in the range of about 12 inches to about 20 inches, about 7.5 inches high or in the range of about 5 inches to about 10 inches, and about 10 inches deep or in the range of about 7 inches to about 13 inches. Thus, the housing can define an internal volume of, for example, about 1200 $in^3$ or in the range of about 420 $in^3$ to about 2600 $in^3$.

As shown in FIG. 1, the grow light system 100 is designed to hang or be placed above a light dependent organism, such as a plant, such that the LEDs engaged with the bottom surface can shine down on a plant. Thus, the grow light system 100 can include any device 123 capable of holding the system 100 above a plant, such as chains as shown in FIG. 1.

Figure 2:
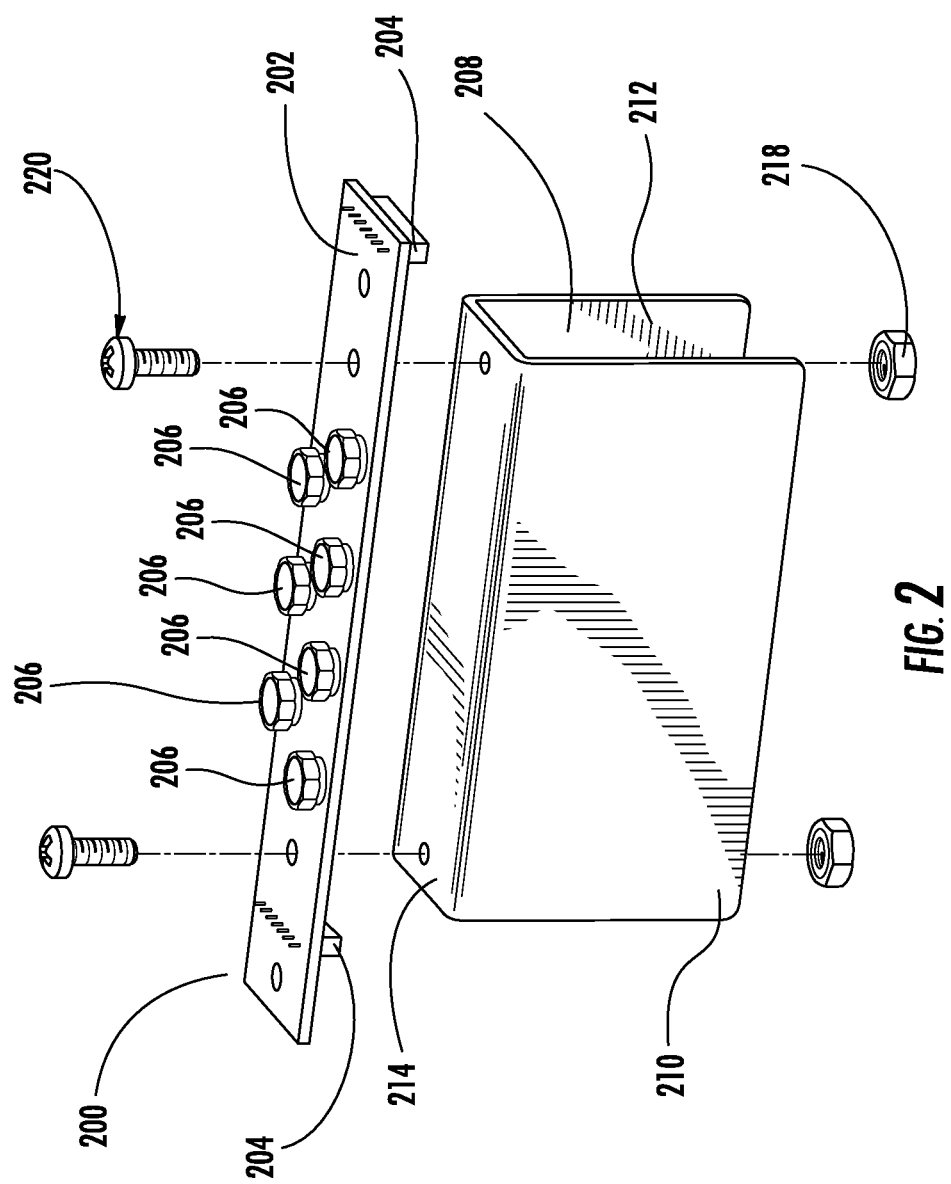
FIG. 2 is a partially exploded view of an LED module according to aspects of this disclosure.
Figure 2B:
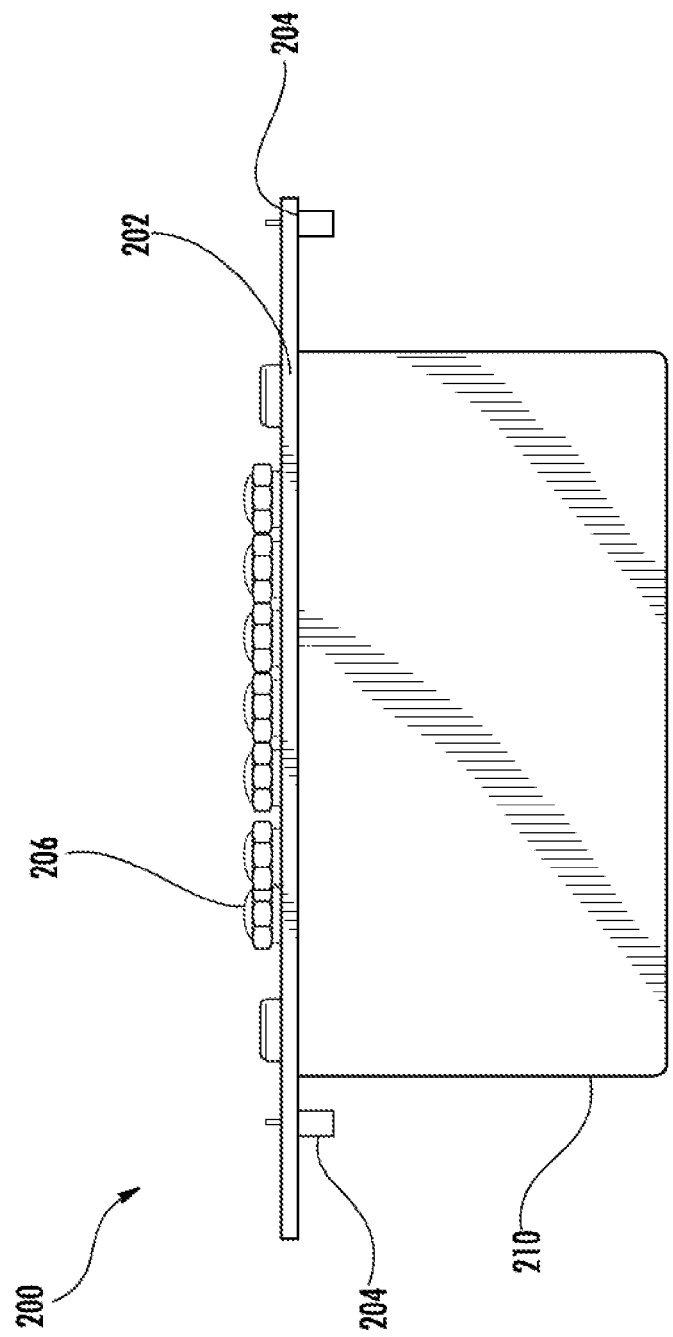
FIG. 2B is a side view of the assembled LED module of FIG. 2.
Figure 2C:
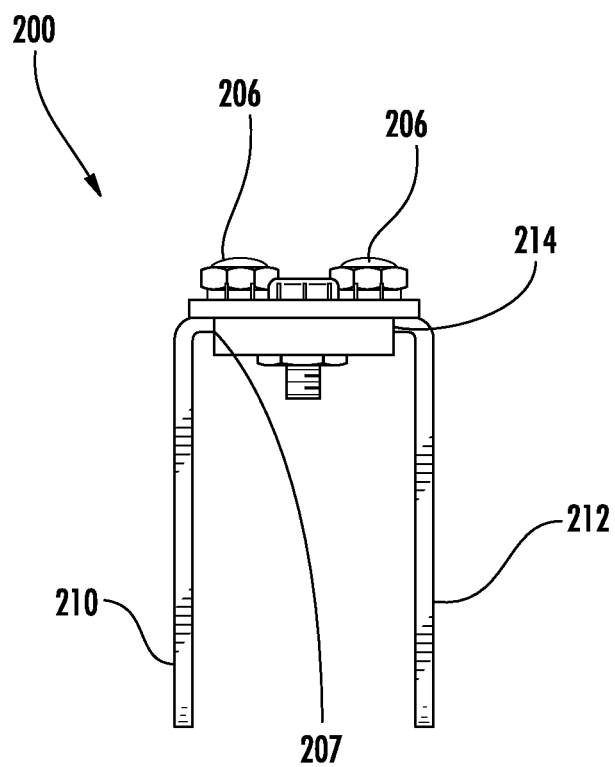
FIG. 2C is a side view of the assembled LED module of FIG. 2.

As shown in FIG. 2 FIG. 2C, the grow light system also includes at least one LED module 200. The LED module 200 includes a circuit panel 202. The circuit panel 202, can be manufactured using any known methods. The circuit panel 202 can include electrical connectors 204, which as will be discussed in more detail below, connect to a carrier board to supply power to the LED module 200.

The LED module 200 also includes a plurality of LEDs 206 electrically connected to the panel 202. As shown in FIG. 2 FIG. 2C, seven LEDs are shown attached to the panel 202 of the LED module 200, however, any number of LEDs 206 can be used on the panel 202. For example, in some embodiments, the panel 202 can include in the range of 3 to 10 LEDs 206. The LED 206 on any particular module 206 can be similar to each other or can be of different brightness/ intensity (lumens, PAR, etc.), wavelength, and illumination angle to allow the LED module 206 to be customized and adapted easily for multiple different applications or methods.

Each module 200 can include different combinations of LEDs 206 having the same or different wavelengths. As is known in the art, the wavelength of the LED 206 determines the color of the LED 206. For example, far red LEDs can have a wavelength of about 720 nm-740 nm, photo red LEDs can have a wavelength of about 650-670 nm, dark red LEDs can have a wavelength of about 660 nm-665 nm, red LEDs can have a wavelength of about 620 nm-630 nm, red-orange LEDs can have a wave length of about 610 nm-620 nm, amber LEDs can have a wavelength of about 585 nm-595 nm, green LEDs can have a wavelength of about 520 nm-550 nm, cyan LEDs can have a wavelength of about 490 nm-520 nm, blue LEDs can have a wavelength of about 465 nm-485 nm, dark blue LEDs can have a wavelength of about 455 nm-460 nm, royal blue LEDs can have a wavelength of about 450 nm-465 nm, warm white light LEDs can have more red wavelengths and are rated in color temperatures of about 2,000-4,000 K, and cool white light LEDs can have more blue wavelengths are rated in color temperatures of about 5,000-10,000K. In some examples, the warm white LEDs may be rated in color temperatures of 2700K or 3000K. In some examples, the cool white LEDs may be rated in color temperatures of 5700K or 6500K. Some LEDs may, for example, emit wavelengths of light that are not visible (e.g., ultraviolet (UV) light). For example, UVA LEDs can have a wavelength of about 362 nm-370 nm. In some examples, UVA LEDs can have a wavelength of 420 nm. In some examples, UVA LEDs can have a wavelength of 315 nm-400 nm. In some examples, wavelengths outside of these disclosed ranges may be used.

In some embodiments, each of the LEDs 206 on an LED module 200 can be of about the same wavelength. In other embodiments, the LEDs 206 on a LED module 200 can vary. For example, some LED modules 200 can include LEDs having a ranging of wavelengths from about 400 nm to about 700 nm.

In some embodiments, each of the LED modules 200 on a particular grow light system 100 can have similar layouts of LEDs 206. As shown, for example, in FIG. 2A each LED 206 can have a certain location 206A, 206B, 206C, 206D, 206E, 206F, 206G. Thus, in a particular grow light system, each of the LED modules 200 can have a similar LED in the 206A location, a similar LED in the 206B location, a similar LED in the 206C location, a similar LED in the 206D location, a similar LED in the 206E location, a similar LED in the 206F location, and a similar LED in the 206G location. In another example, a row of LEDs 206 (for example 206A, 206B, 206C) on each LED module 200 could be red LEDs and another row (for example 206D, 206E, 206F, and 206G) could be all green LEDs. In this configuration, an operator could turn off the red LEDs and turn on the green LEDs when operators will be working on the light dependent organisms, such as plants, but do not want to encourage photosynthesis. In other embodiments, a system can have a range of only red LEDs that could provide higher levels of that wavelength during critical times of plant growth. During other periods of plant growth these LED modules could be later replaced with LED modules having other wavelengths, such as general purpose LED modules with basic colors used by plants.

The LED module 200 also includes a heat sink fin 208. The heat sink fin 208 can be generally U-shaped having a first wall 210 that extends away from the panel 202 and can be generally perpendicular to the panel 202, a second wall 212 that extends away from the panel 202 and can be generally perpendicular to the panel 202, and a third wall 214 that can be generally parallel with the panel and connects to the first wall 210 and to the second wall 212. Although a single heat sink fin 208 is shown in FIG. 2 FIG. 2C the heat sink fin 208 can, for example, comprise multiple U-shaped fins. Although a U-shaped fin is shown, other heat sink fin shapes can be used. Additionally the heat sink fin can include other features, such as tabs, holes, or other elements, on the fin that can increase heat dissipation.

The size of the heat sink fin 208 can be important to the functionality of the grow light system 100. The height of the first and second walls 210, 212 can be approximately 1.75 inches or in the range of about 1.5 inches to about 3 inches. The length of first and second walls 210, 212 can be approximately 3 inches or in the range of about 2 inches to about 5 inches. The third wall 214 can have a width of about 1 inch or in the range of about 0.5 inches to about 2 inches. Thus, the first and second walls 210, 212 can be spaced apart from each other by about 1 inch or in the range of about 0.5 inches to about 2 inches.

The heat sink fin 208 is a passive heat exchanger configured to cool the LED module 200 by dissipating heat from the panel 202 and the LEDs 206. The heat sink fin 208 can be manufactured of any suitable material. In some examples the heat sink fin 208 can be manufactured of aluminum or aluminum alloys, and other materials can include copper, composite materials, and other good heat conducting materials.

The heat sink fin 208 can be removably or permanently attached to the panel 202 in any suitable manner. As shown in FIG. 2, the heat sink fin 208 can be attached to the panel 202 with a nut 218 and bolt 220 attachment mechanism at either side of the panel 202. Any other suitable attachment mechanism can be used including the use of adhesives. The LED module 200 can also include a heat conducting element, such as a highly conformable, low-modulus material such as silicone polymer, positioned between the panel 202 and the heat sink fin 208 to facilitate heat transfer between the panel 202 including the LEDs 206 and the heat sink 208.

Figure 3:
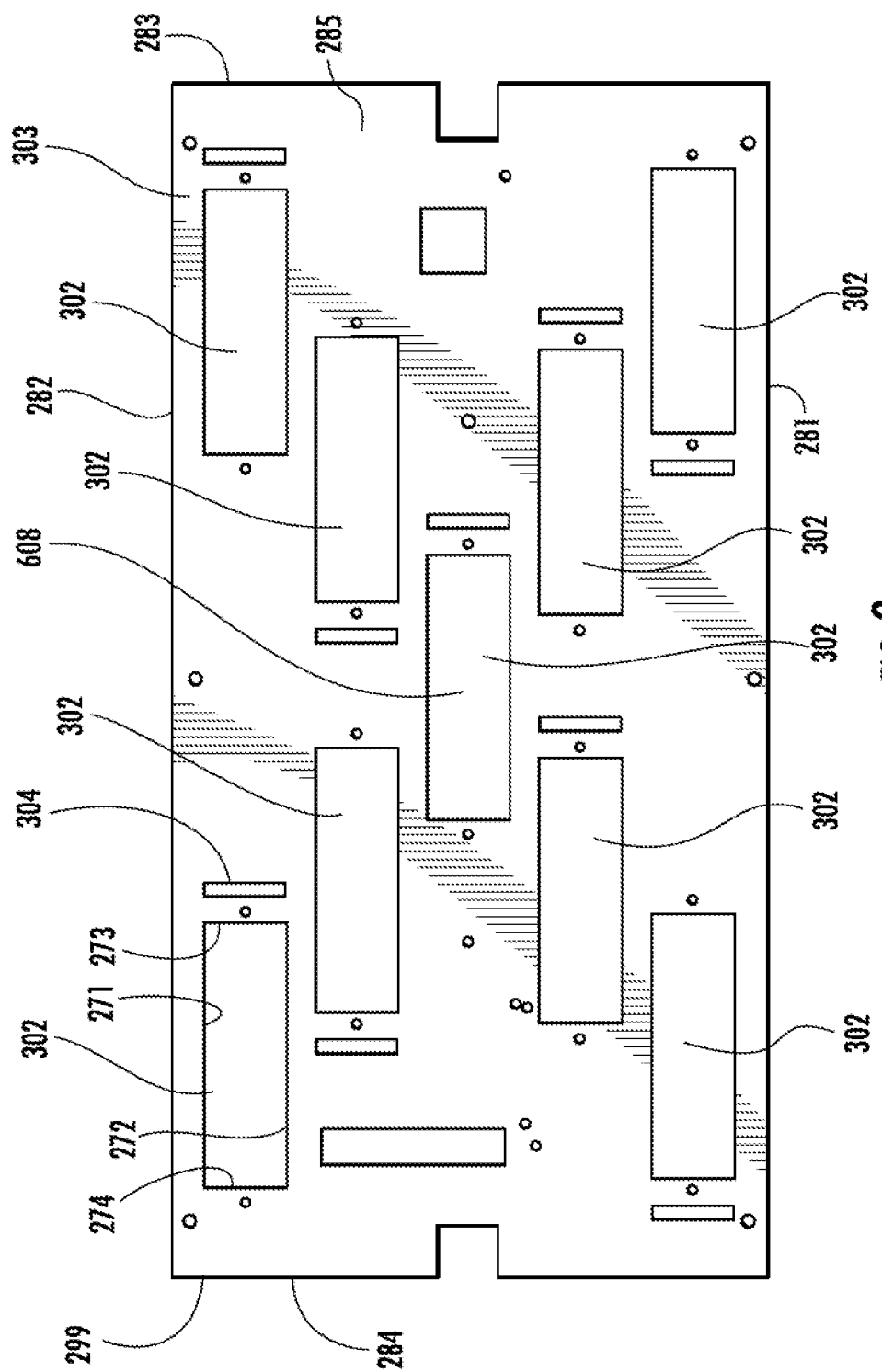
FIG. 3 is a bottom view of a carrier board mounting plate according to aspects of this disclosure.

The grow light system 100 can also include a carrier circuit board assembly or carrier board 300 that can form the bottom side of the housing 101, can removably engage the LED modules 200, and can contain circuits to electrically connect components engaged with the board including the LED modules 200. The carrier board 300 contains apertures 302 for insertion of the LED modules 200. As shown in FIG. 3 (depicting an example mounting plate) and FIG. 4 (depicting an example carrier board assembly 300), the carrier board assembly 300 can include nine generally rectangular apertures 302 to house nine LED modules 200. In some embodiments the number of apertures 302, and hence the number of LED modules 200, can vary. For example, in some embodiments, there can be in the range of about 5 and 12 LED modules. Each aperture 302 can have a first and second lateral edge 271, 272, and a first and second longitudinal edge 273, 274. The carrier board assembly 300 can also include electrical connectors 304 for interfacing with the electrical connectors 204 of the LED modules 200 to provide power to the LED modules 200.

As shown in FIG. 3, apertures 302 can be defined in the mounting plate 299. In an embodiment, the mounting plate 299 includes a front edge 281, a rear edge 282, a right side edge 283, a left side edge 284, and a surface 285 contiguous to and extending between the edges. In an embodiment, the mounting plate 299 can be configured so that it can be positioned proximate the bottom of the housing 101 to form a bottom surface of the housing. In an embodiment, the front edge 281 can be positioned proximate the front side 102 of the housing 101, the rear edge 282 can be positioned proximate the back side 104 of the housing 101, and the right and left sides 283, 284 can be positioned proximate respective sidewalls 110. In an embodiment, the mounting plate is configured to direct airflow into the apertures 302 and/or gaps defined between the aperture edges 271, 272, 273, 274 and an LED module 200 positioned in the aperture 302, as described below, as the fan draws air into the housing 101. In an embodiment, the apertures 302 form a generally X-shaped layout which has been found to be very conducive to growing plants, however the carrier board assembly 300 can be configured in different sizes and shapes with different layouts of LED modules 200 to provide for optimal plant light coverage. The apertures 302, for example, can be arranged in different patterns such as circular, rectangular, or columns and rows. In another embodiment, the LEDs 206 can form a grid pattern. In still other embodiments, the carrier board assembly 300 could be longer and/or have a thinner width that would be optimal for placement on a long narrow shelf. The LED modules in such a configuration could be placed in rows or other suitable layout.

Figure 4:
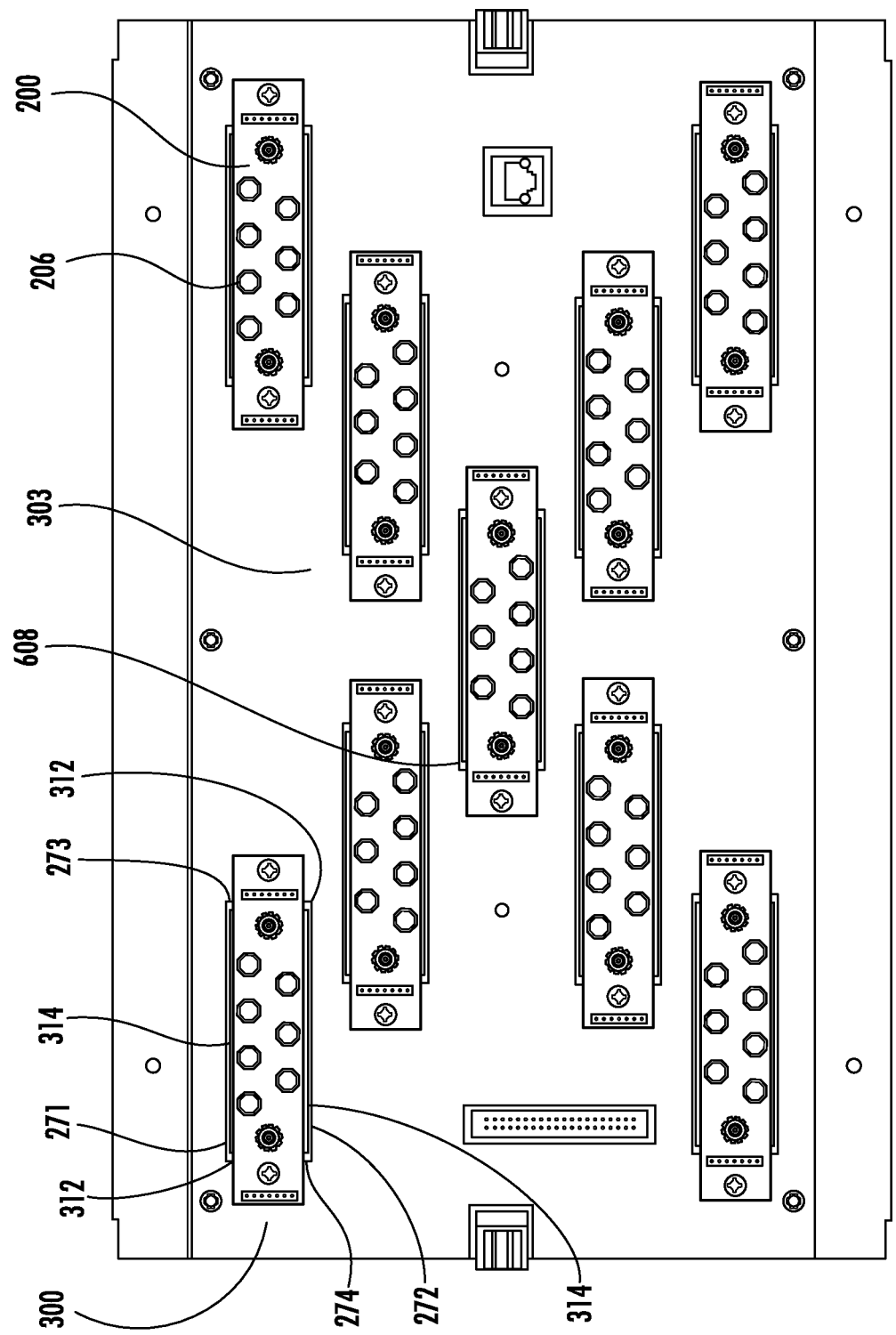
FIG. 4 is a bottom view of the carrier board assembly including LED modules.
Figure 5:
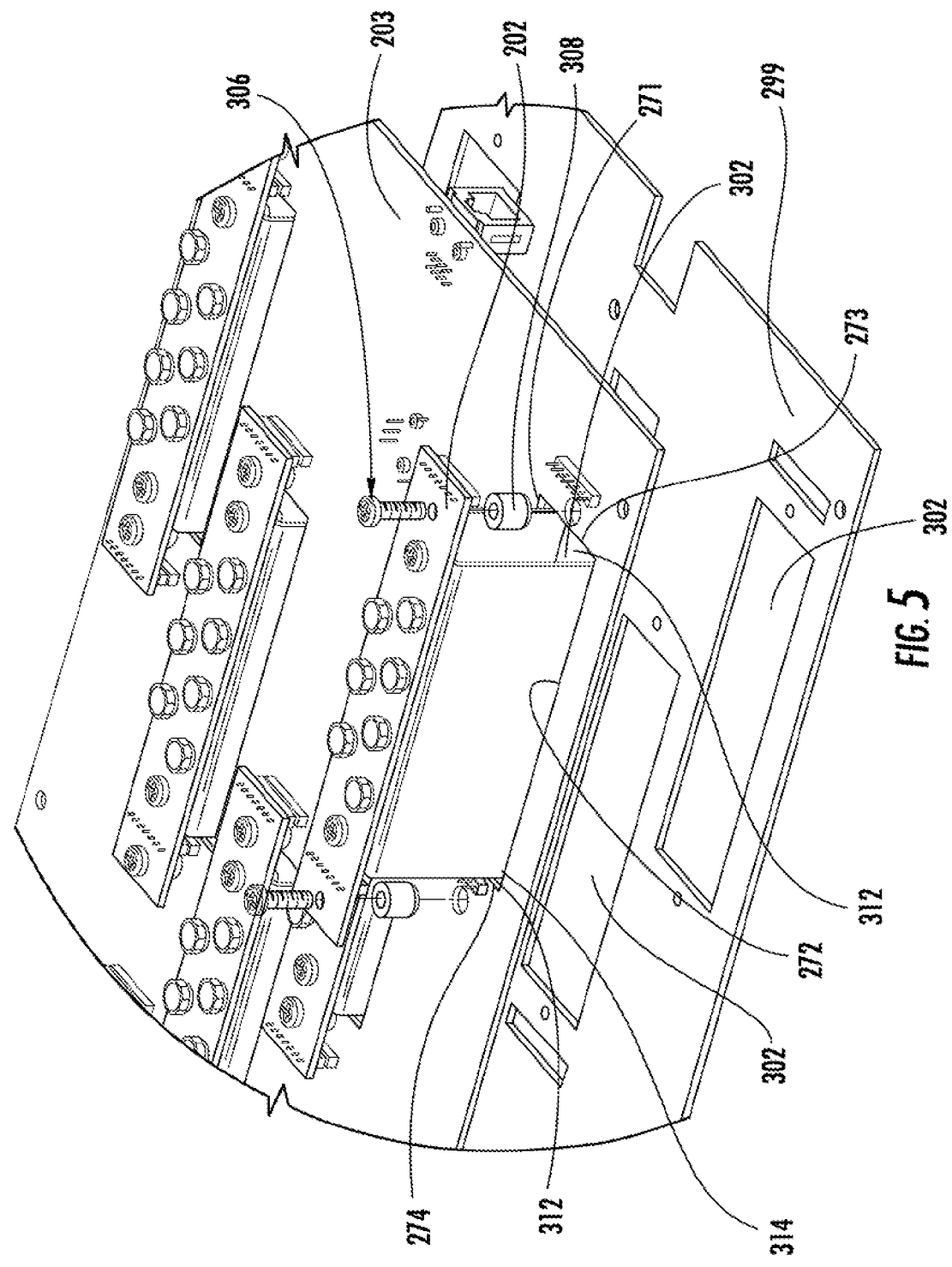
FIG. 5 is a perspective, detail, partially exploded view of FIG. 4

FIGS. 4-5 show the LED modules 200 installed in the carrier board assembly 300. The LED modules 200 can connect to the carrier board 300 using any type of suitable fastener. As shown in FIG. 5, the fastener 306 can be a screw connection, a nut and bolt system, or any other suitable fastener including adhesive. The carrier board assembly 300 can be formed of any common materials using standard manufacturing processes.

Figure 4A:
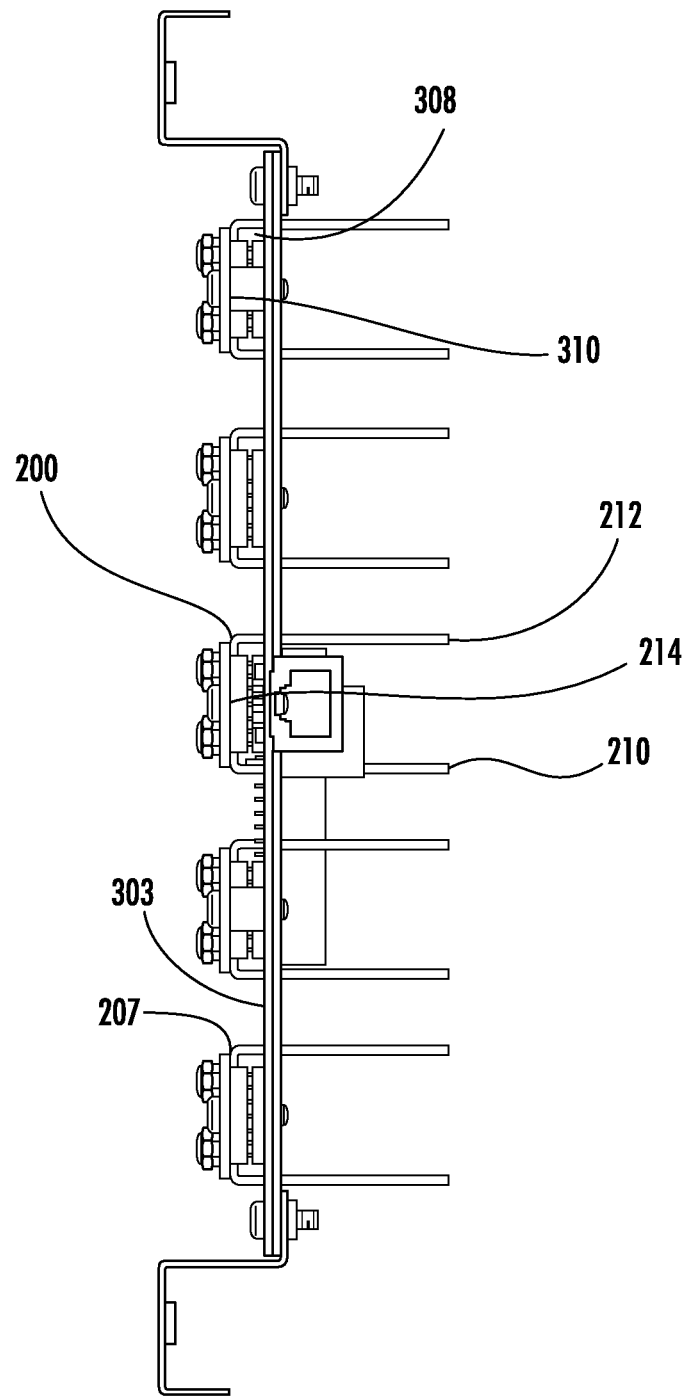
FIG. 4A is a side view of the carrier board assembly of FIG. 4.

As shown best in FIGS. 4A and 5 the LED modules can be spaced from the face 303 of the carrier board assembly 300. In some embodiments the LED modules 200 can be spaced from the face 303 of the carrier board 300 using a spacer 308. The spacer can be formed of any material and in some embodiments can be formed of a nonconductive material such as plastic. The spacer can be about 0.25 inches high or in the range 0.125 inches to about 0.5 inches. In other embodiments, the LED modules can be spaced from the face 303 of the carrier board assembly 300 without the use of a spacer.

This space between the face 303 of the carrier board 300 and the back 207 of the LED module 200 can define a vertical gap 310. Additionally, as shown at least in FIG. 5, the apertures of the carrier board 202 are sized to be slightly larger than the heat sink fin 208 forming additional gaps between the carrier board assembly 300 and the heat sink 208. For example, in the longitudinal direction, or length of the LED module 200, there can be a longitudinal gap 312 on either side of the heat sink 208 (between the longitudinal edges 273, 274 of the aperture 302 and the heat sink 208) of approximately 0.0125 inches or in the range of about 0.00625 inches to about 0.25 inches. Similarly, in the lateral direction, or width of the LED module, there can be a lateral gap 314 on either side of the heat sink 208 (between the lateral edges 271, 272 of the aperture 302 and the heat sink 208) of approximately 0.00625 inches or in the range of about 0.003125 inches to about 0.25 inches.

Although LEDs can reduce the temperature of a grow light system, LEDs 206 can still cause the temperature of the grow light system 100 to exceed preferred operational levels which can decrease the life of the LED. The gaps 310, 312, and 314 along with the heat sink fin 208 can reduce the temperature of at least portions of the grow light system 100. As described above, the grow light system 100 includes a cooling fan 114. The cooling fan 114 is configured to draw ambient air from outside of the grow light system into the housing 101 through the gaps 312, 314, and 316 which can cause a negative pressure inside the housing 101. The fan can then blow the air out the top side 106 of the housing 101. More specifically, each of the vertical gap 310, longitudinal gaps 312, and lateral gaps 314, are configured such that air can be drawn by the cooling fan 314 over the face of the LEDs 206 on the panel 202, through the gaps, 310, 312, and 314 and along the fin 208. The cooling fan 114 can be any fan suitable to reduce the temperature of the LED modules 200. In some examples, the fan can be sized to move a lot of air providing a greater cooling effect, however, this can increase the noise produced by the system. In other embodiments, the fan 114 can run at lower speeds providing less cooling but less noise as well. Fans, heat sinks, and gaps in carrier board can be sized appropriately to provide optimum cooling with the least amount of side effects, such as noise and internal temperature rise.

Figure 6:
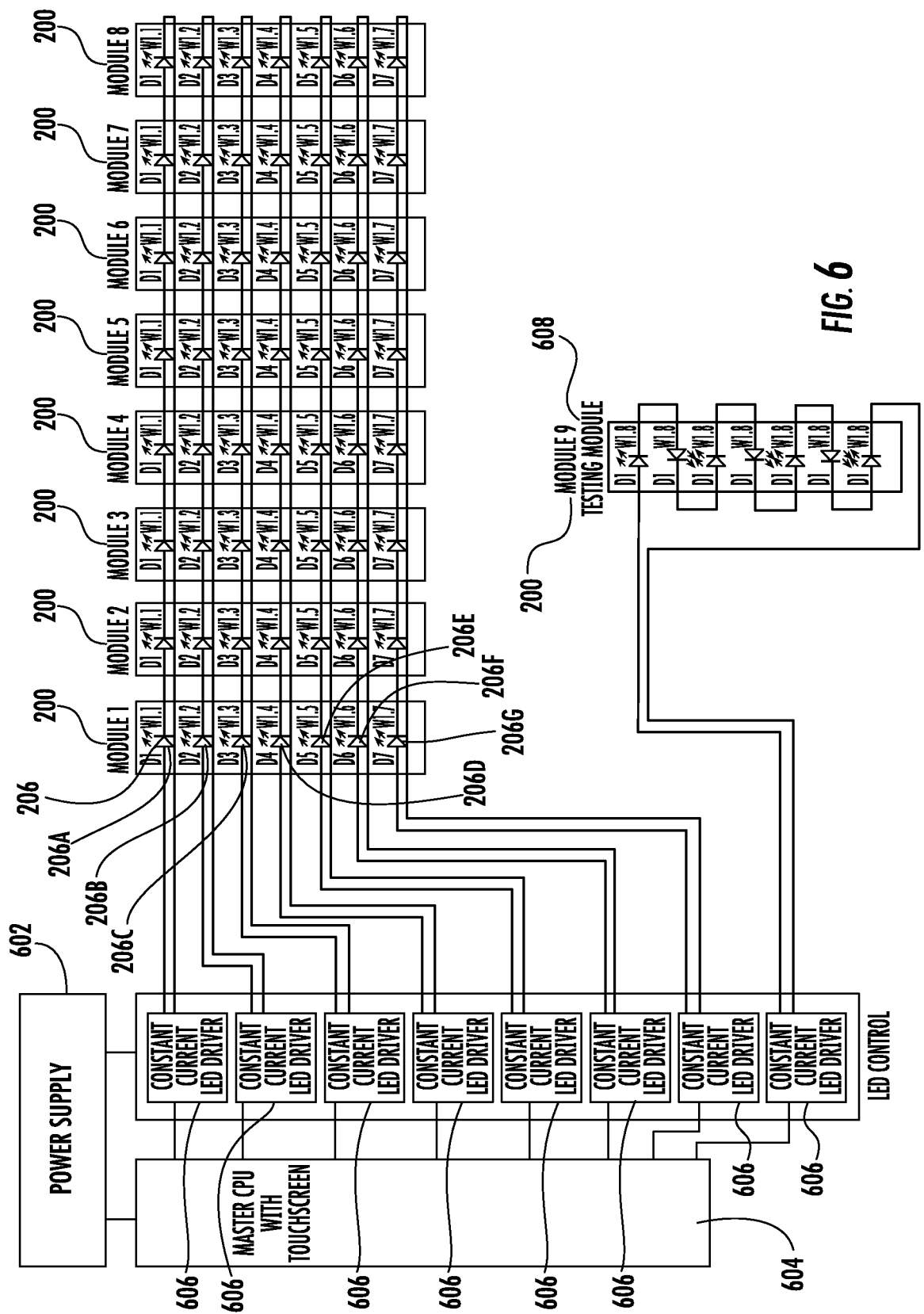
FIG. 6 is a wiring diagram of an LED lighting system according to aspects of this disclosure.

Referring now to FIG. 6 which shows a circuit diagram representing the grow light system 100. The grow light system includes a power supply 602 for providing power to the grow light system and includes a master CPU 604 for controlling the grow light system 100. The grow light system 100 can also include LED Drivers 606 to control the LED circuits. As described above, each LED module 200 can include a plurality of LEDs 206 (represented as D1 (206A), D2 (206B), D3 (206C), D4 (206D), D5 (206E), D6 (206F), and D7 (206G) in FIG. 6). As shown in FIG. 6, each LED 206 corresponding to the same location on a particular LED module 200 can be wired in series with the other corresponding LEDs 206 of the other LED modules 200. In other embodiments, LEDs having the same wavelength, color, or a number of other variables can be wired in series together. For example, as shown in FIG. 6, each of the LEDs 206 represented as D1 (206A) can be wired in series with each other, each of the LEDs 206 represented as D2 (206B) can be wired in series with each other, each of the LEDs 206 represented as D3 (206C) can be wired in series with each other, each of the LEDs 206 represented as D4 (206D) can be wired in series with each other, each of the LEDs 206 represented as D5 (206E) can be wired in series with each other, each of the LEDs 206 represented as D6 (206F) can be wired in series with each other, and each of the LEDs 206 represented as D7 (206G) can be wired in series with each other. For example, in some embodiments, all LEDs 206 represented as D1 may be blue LEDs (455 nm-470 nm) and all LEDs 206 represented as D2 may be red LEDs (620 nm-665 nm). Additionally, as shown in FIG. 6, each of the LEDs 206 represented by D1 (206A) are connected to a single LED driver 606, each of the LEDs represented by D2 (206B) are connected to a different LED driver 606, and so on. Wiring the LEDs in series in this manner can provide significant advantages to a user. As will be discussed in more detail below, this allows a user to vary the intensity of each of the D1 (206A), D2 (206B), D3 (206C), D4 (206D), D5 (206E), D6 (206F), and D7 (206G) LEDs independently. Thus, for example, a user could increase the intensity of the D1 LEDs (206A) and/or decrease the intensity of the D2 LEDs (206B). Additionally, as will be discussed below, if, for example, a D1 LED failed the user could quickly identify that one of the D1 LEDs must be replaced.

As shown in FIG. 6, in addition to wiring the LEDs 206 of the grow light system 100 in series, the grow light system 100 can include one LED module 200 that is not wired in series like the other LED modules 200. This LED module 200 can be the same or similar to the other LED modules 200 and it can differ in that it is electrically connected through the carrier circuit board assembly 300 differently than the other LED modules 200. As shown in FIG. 4, the carrier circuit board assembly 300 can include one LED module 200 location that can be designated the test location 608. This test location 608 as shown in FIG. 6 is not wired in series like the other LED modules 200 and can allow a user to individually test a LED module 200 for operability. For example, if one of the D1 LEDs (206A) stops working on one of the LED modules 206, all of the D1 LEDs (206A) on the LED modules 200, except for the LED module 206 in the test location 608, will stop working. This can allow the user to quickly identify which LED location (for example 206A, 206B, 206C, 206D, 206E, 206F, or 206G) is not working. The LED module 206 that needs to be replaced can quickly be determined using the test location 608 as a module testing point.

The grow light system 100 can also include a plurality of components having various functions to provide a user interface, system monitoring, control, data collection, and file sharing. The grow light system 100 can be used in various applications and is described herein as adapted for growing plants as a particularly useful example. In an embodiment, the grow light system 100 can include one or more control processors, growing environment sensors, a real time clock, date and time logging device, executable programs, non-volatile memory, analog signal converters for inputs and outputs, digital signal generators for inputs and outputs, interface hardware and software for interfacing with other controls (such as, for example, RS232, RS485, and similar controls), power supply, audio devices, display with or without touchscreen and with or without video or slide show capability, Wi-Fi module, local wireless connections (Bluetooth, ZigBee), and USB interface.

Figure 7:
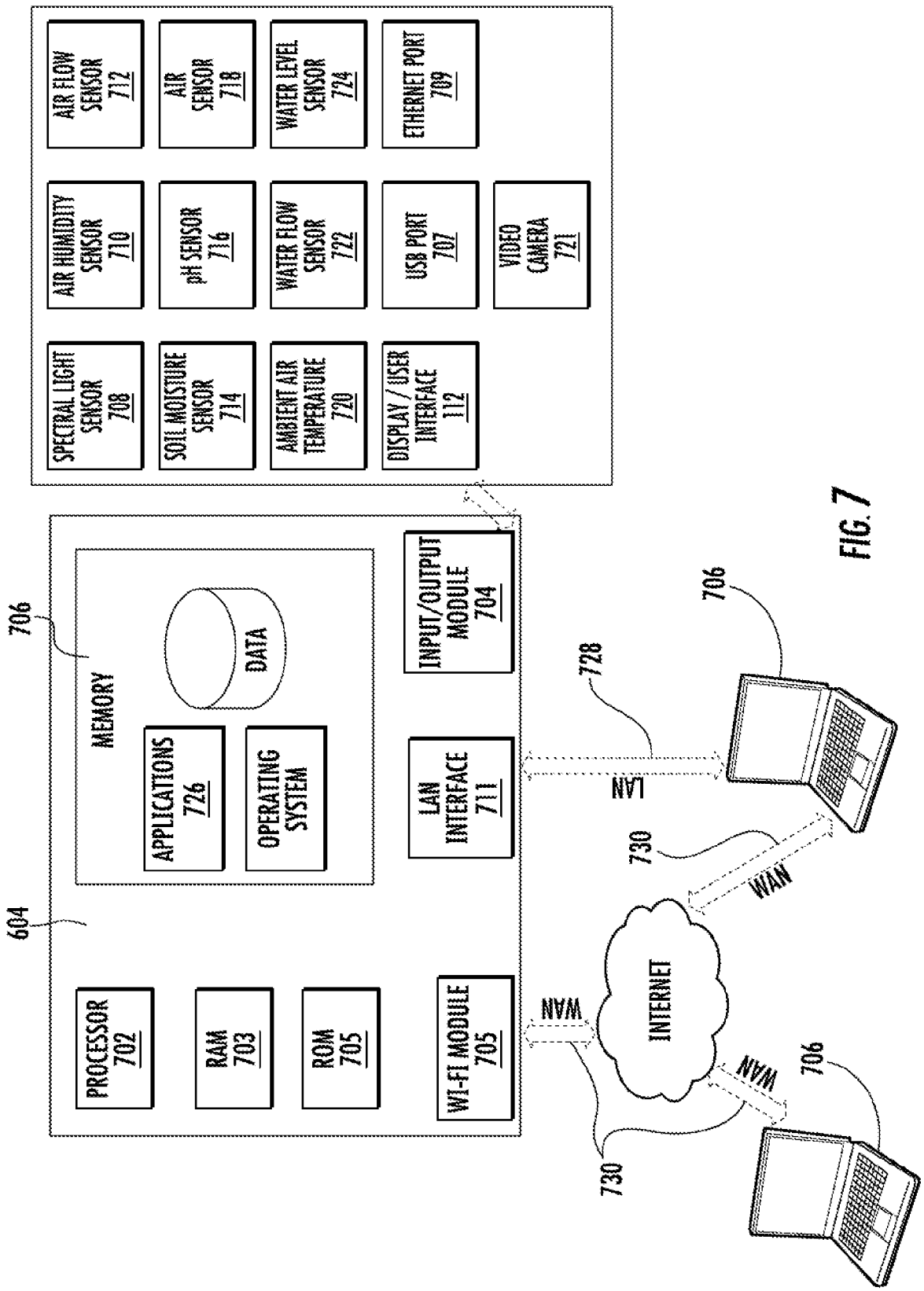
FIG. 7 is an illustrative operating environment in which various aspects of the disclosure may be implemented.

As shown in FIG. 7, the grow light system 100 can include a number of components that can be used to control and optimize the growing of plants. The grow light system 100 can include one or more processors 702 for controlling overall operation of the system and its associated components, including RAM 703, ROM 705, input/output module 704, memory unit 706, display and/or user interface 112, Wi-Fi module 705, and a LAN interface 711.

The input/output module 704 can include a, keypad, touch screen, and/or stylus through which a user of the grow light system 100 can provide input, and may also include one or more of a speaker for providing audio input/output and a video display device for providing textual, audiovisual and/or graphical output. Additionally, the input/output module can include a number of ports, such as USB port(s) 707 and Ethernet port(s) 709 for sending and receiving information.

In embodiments, the grow light system 100, through the I/O module 704, can monitor and control operation of a growing environment. For example the I/O module 704 can receive information from a spectral light evaluation sensor 708 to provide a spectral light evaluation; an air humidity sensor 710 to determine the humidity of the air in the growing environment; an air flow sensor 712 to determine the air flow in the growing environment; a soil moisture sensor 714 to determine the moisture of the soil in a growing environment; a pH sensor 716 to determine the pH of the soil (or other growing medium such as water in a hydroponic environment) in the growing environment; an air sensor 718 to determine the air composition in the growing environment including for example carbon dioxide levels and oxygen levels; an ambient air temperature sensor 720 to determine the air temperature in the growing environment; and a video camera 721 to view the growing environment. Additionally, the grow light system 100 can be used in hydroponic applications, and in such applications additional sensors can be included in the grow light system 100. For example, the I/O module 704 can receive information from a water flow sensor to determine the water flow in the hydroponic growing environment 722; and a water level sensor 724 to determine the water levels in the hydroponic growing environment.

The I/O module 704 can receive inputs from at least the sensors 708, 710, 712, 714, 716, 718, 720, 721, 722, 724. The data from these sensors can be monitored, and stored or data logged in the memory 706. As will be discussed in more detail below, based on the data from these sensors, the grow light system 100 can make changes to the growing environment based on preset parameters. For example, in some embodiments, water or nutrients could be added to the growing environment based on the data from the sensors. In still other embodiments, if any parameters are outside of certain preset limits, the grow light system could shut down and an alarm could be sent to the operator. In some examples, the sensors 708, 710, 712, 714, 716, 718, 720, 721, 722, 724 may be external to the grow light system 100. For example, an external box comprising the sensors 708, 710, 712, 714, 716, 718, 720, 721, 722, 724 may plug into or otherwise electronically or wirelessly connect to the grow light system 100. In some examples, the grow light system 100 may determine when the measurements indicated by the sensors 708, 710, 712, 714, 716, 718, 720, 721, 722, 724 are outside of a desired range and may emit an alarm to indicate out of range parameters. In still other embodiments, the grow light can be adapted to adjust light intensity and/or spectrum to optimize growth and/or protect the plants from harm. Additionally the grow light system 100 can log information from each of the sensors along with other information such as date and time information which can be used to build a program for growing a particular type of plant.

As shown in FIG. 7, the I/O module 704 can also receive information through at least the user interface 112, Wi-Fi module 705, LAN interface 711, and one or more ports such as a USB port 707 and an Ethernet port 709. As will be discussed in more detail below, a user can change any number of different growing environment variables from the user interface 112. The ports 707 and 709 can provide additional information from any number of different sources. The ports can be used, for example, to network multiple grow light systems 100 together. Additionally, the ports 707, 709 can be used, for example, to download certain growing condition information to the grow light system 100. For example, a user could download a program for growing a certain type of plant, and in some embodiments this program can provide an ideal growing environment for that particular type of plant.

Software may be stored within memory unit 706 and/or other storage to provide instructions to the processor(s) 702 for enabling the grow light system 100 to perform various functions. For example, memory unit 706 may store software used by the grow light system 100, an operating system of the grow light system 100, application programs of the grow light system 100, and/or an associated internal or external database(s). The memory unit 706 can include one or more of volatile and/or non-volatile computer memory to store computer-executable instructions, data, and/or other information.

The processor 706 and its associated components may allow the grow light system 100 to receive information corresponding to a plurality of operating information from sensors and devices associated with a grow light system 100 and related devices. As described above, such operating information can include, for example, lighting information, humidity information, air flow information, soil moisture information, pH information, air composition information, ambient air temperature information, water flow information, and water level information. Additional information can include, for example, date, time and energy consumption. The processor 706 and its associated components can in some embodiments analyze this operating information, such analysis can include comparison of the operating information with an operating protocol, calculation of a property of the operation of grow light system 100, and/or identification of operating information to include in a report or notification; generate a report or notification regarding the analysis of the operating information; and sending the report or notification to a mobile device or server configured to be accessed by authorized users.

Figure 8:
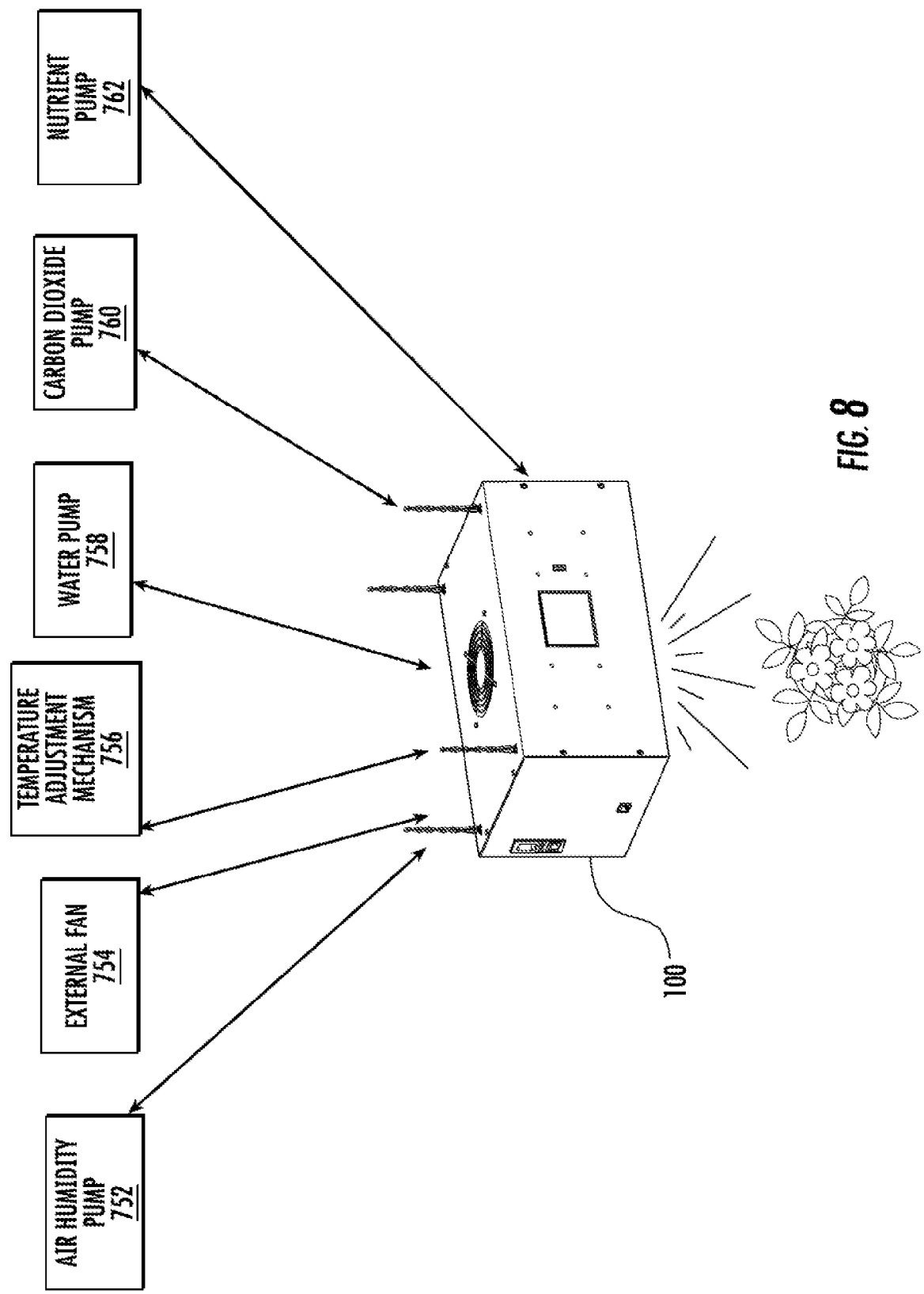
FIG. 8 is an illustrative operating environment in which various aspects of the disclosure may be implemented.

As shown for example in FIGS. 7 and 8 the grow light system 100 can also include a number of additional devices that can affect the growing environment. These additional devices can include, for example, an air humidity pump 752 which can be used to increase the humidity of the air in the growing environment; an external fan 754 which can be used to increase air flow in the growing environment and also can be used to decrease humidity and change air conditions in the growing environment; a temperature adjustment mechanism 756 which can be used to raise or lower the temperature in the growing environment; a water pump 758 which can be used to deliver water to the growing environment and in hydroponic growing environments can be used to increase water flow in the hydroponic environment; a carbon dioxide pump 760 which can be used to pump carbon dioxide into the growing environment; and a nutrient pump 762 which can be used to deliver nutrients such as fertilizer to the growing environment.

Light has three principal characteristics that affect plant growth: quantity, quality, and duration. Light quantity refers to the intensity or concentration of light. Light quality refers to the color or wavelength reaching the plant surface. Red and blue light generally have the greatest effect on plant growth. Blue light is primarily responsible for vegetative growth or leaf growth. Red light when combined with blue light, encourages flowering in plants. Light duration or photoperiod refers to the amount of time that a plant is exposed to light within a certain amount of time (such 24 hours) and this can affect a plant's ability to flower. As stated above, the grow light system 100 can include a spectral light evaluation sensor 708. Based on the readings of the spectral light evaluation sensor 708, the grow light system 100, through the processor 702, can adjust certain lighting parameters such as the intensity quantity, quality, and duration of the light being emitted from the LEDs 206. For example, the grow light system 100 can turn on or off certain LEDs having a particular wavelength (i.e. blue light, red light, green light, etc.) and/or increase or decrease their intensity. In other embodiments the grow light system 100 can be programmed for a certain type of plant for which the ideal spectral light schedule is known and the grow light system 100 can automatically adjust the LEDs based on the known schedule. In still other embodiments the user can manually adjust the LEDs 206 as required through the user interface 112. In still other embodiments the grow light system 100 can monitor ambient light levels and adjust to the ambient light conditions. For example the grow light system 100 can be used as supplemental lighting. When ambient light levels are inadequate, for example during a period of inclement weather conditions, the grow light system 100 can turn on or increase the intensity of the LEDs 200.

Additionally, water is a primary component of plant growth. Water maintains the turgor pressure or firmness of tissue and transports nutrients throughout the plant. Water is present in multiple locations in a growing environment such as the humidity in the air and the moisture in the soil. Proper plant growth can be affected by both the humidity in the air and the moisture in the soil. Plant growth can be affected by the timing and amount of water applied during production. Certain stages of plant growth are more sensitive to water stress than others. Based on the readings provided by sensors such as the air humidity sensor 710, the soil moisture sensor 714, and in hydroponic growing environments, the water flow sensor 722 and the water level sensor 724, the grow light system 100, through the processor 702, can adjust certain water levels. For example, if the air humidity sensor 710 detects an air humidity that is too low for a particular growing environment, the I/O module can activate the air humidity pump 752 to increase the air humidity. Similarly, for example, if the soil moisture sensor 714, water flow sensor 722, or water level sensor 724 detect water levels that are too low, the water pump 758 can be activated to provide water and/or water flow to the growing environment. As with all other adjustments, the user can manually adjust the air humidity pump 752 and the water pump 758 as necessary through the user interface 112 or other input.

Further, carbon dioxide is necessary for photosynthesis and proper carbon dioxide concentration through the course of the growing process can allow for faster maturation and larger yield. For example, a carbon dioxide level in the growing environment between 700 and 900 ppm can improve crop development and yield. In some embodiments, the grow light system 100 can include an air sensor 718 to determine the composition of the air in the growing environment including for example carbon dioxide levels and oxygen levels. If, for example, the carbon dioxide levels are too low, the carbon dioxide pump 760 can be activated to provide additional carbon dioxide to the growing environment.

Similarly, other sensors, such as pH sensor 716, the ambient air temperature sensor 720, and the air flow sensor 712, measure growing environment qualities that are important to growing plants. The pH level, for example, is the measure of the acidity or alkalinity of a soil and can be important to a number of factors affecting plant growth. Ambient air temperature is also important to plant growth and can affect photosynthesis, respiration, transpiration, flowering, and sugar storage. Air flow is also important to plant growth. As described above with regard to other sensors, devices such as the nutrient pump 762 (to add nutrients such as fertilizer to the growing environment), temperature adjustment mechanism 756 (to raise or lower the temperature of the growing environment), and external fan 754 (to provide air flow in the growing environment) can be activated to optimize the growing environment based on information from the sensors 716, 720, and 712 or based on user input from, for example, the user interface 112.

One or more application programs 726 used by the grow light system 100 may include computer executable instructions (e.g., analysis programs, operational data determination algorithms, and growing environment analysis and manipulation algorithms) for transmitting, receiving, and executing information and instructions related to the grow light system 100 and related equipment as described herein and for performing other related functions as described herein.

As shown in FIG. 7, the grow light system 100 may operate in a networked environment supporting connections to one or more remote computers, such as terminals/devices 726. Thus, the grow light system 100 and terminals/devices may each include personal computers (e.g., laptop, desktop, or tablet computers), servers (e.g., web servers, database servers), and/or mobile communication devices (e.g., mobile phones, portable computing devices, and the like), or commercial monitoring devices, and may include some or all of the elements described above with respect to the grow light system 100. The network connections depicted in FIG. 7 include a local area network 728 (LAN) and a wide area network 730 (WAN), other networks, such as a wireless telecommunications network, may also be included. When used in a LAN networking environment 728, the grow light system 100 may be connected to the LAN 728 through a network interface or adapter. When used in a WAN networking environment 730, the grow light system 100 device may include a Wi-Fi module 705 or other means for establishing communications over the WAN 730, such as the Internet). When used in a wireless telecommunications network, the grow light system 100 device may include one or more transceivers, digital signal processors, and additional circuitry and software for communicating with wireless computing devices (e.g., mobile phones, tablets) via one or more network devices (e.g., base transceiver stations) in the wireless network.

It will be appreciated that the network connections shown are illustrative and other means of establishing a communications link between the grow light system 100 and terminals/devices may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and driving analysis system components described herein may be configured to communicate using any of these network protocols or technologies.

In an embodiment, the Wi-Fi module 705 can be adapted to host a localized web page for monitoring and control of the grow light system 100. This capability can also be referred to herein as an on-board web server for the grow light system 100. In an embodiment, the on-board web server can provide real-time data to a local device that has web browsing capability. This allows, for example, a local device and/or networked device shown in FIGS. 7 and 8 with standard browser application (such as Google Chrome, Internet Explorer, Firefox, etc.) to access the grow light system 100 device for monitoring and control of the device. For example, the web page can be customized to include information relevant to the plant growing environment such as the spectral light, air humidity, air flow, soil moisture, pH level, air composition, ambient air temperature, video of the growing environment, and for hydroponic growing environments the water flow, and water level. For example, an operator can remotely monitor, manage, and watch the current growing environment of plants being grown by the grow light system 100.

In an embodiment, the grow light system 100 can be adapted to send data records to a hosting server for storage, access, and analysis. In an example, the data can include data from each of the sensors and devices 708, 710, 712, 714, 716, 718, 720, 721, 722, 724 and each of the devices 752, 754, 756, 758, 760, and 762. Such information could be used to log and develop a program for growing a particular type of plant.

In certain embodiments, and as described elsewhere herein, the grow light system 100 can include programs for growing certain types of plants. These programs can include information related to each of the sensors 708, 710, 712, 714, 716, 718, 720, 721, 722, 724 and each of the devices 752, 754, 756, 758, 760, and 762 and include date and time information. Thus, for example, the grow light system can include a program for growing a certain type of tomato plant. The program could allow the grow light system 100, through the devices 752, 754, 756, 758, 760, 762, to optimize the growing environment for the tomato plant. For example, the grow light system 100 could automatically provide water to the tomato plant and automatically adjust the intensity of the LEDs based on time and date information. Additionally, the grow light system 100 could receive information from the sensors 708, 710, 712, 714, 716, 718, 720, 721, 722, 724 and automatically adjust the growing environment to optimal conditions for growth of the tomato plant. Additionally, if the sensors 708, 710, 712, 714, 716, 718, 720, 721, 722, 724 indicate that any parameters are out of certain specified limits for the tomato plant, it could adjust those parameters. For example, the grow light system 100 could activate the air humidity pump 752 if the humidity level in the growing environment is too low for the tomato plant.

In some embodiments, and as discussed above, the grow light system 100 can allow a user to record and/or create programs for growing a certain type of plant. The program can include information from the sensors 708, 710, 712, 714, 716, 718, 720, 721, 722, 724, the devices 752, 754, 756, 758, 760, 762, and other information such as the user input information. The grow light system 100 can record system parameters including certain date and time information. For example, a user could adjust a particular wavelength of light from 50% to 100% at 3:00 PM on Day X, and add water to the plant at 1:00 PM on Day Y. These events can be recorded as part of a program. In another example, a user could program the grow light system 100 to adjust a particular wavelength of light from 10% to 75% at 1:00 pm on Day A, and add carbon dioxide to the growing environment on at 9:00 am on Day B. These events could be recorded as part of the program and executed by the grow light system 100.

In some embodiments, the grow light system 100 can include a library system that can store a plurality of programs for growing a number of different types of plants. Additional programs can be uploaded to the grow light system 100 through the USB port 707, the Wi-Fi module 705, the LAN interface 711, or other device.

A user can also download the growing programs from the grow light system 100 that can be shared with other grow light systems 100 and/or other users. The downloadable library system can include any number of different programs including programs used to grow a plant from seed to fruit. In one embodiment a user can download a growing program from a grow light system 100 through the USB port 707, the Wi-Fi module 705, the LAN interface 711, or other device. The program can then be uploaded to another grow light system 100, another storage device, or to a website to share with others.

The grow light system 100 can include a website through which a user can access and upload and download plant growing programs. The website can be run on a computer server accessible via the internet and can allow users to share, edit, and comment on plant growing programs. The website can include a plurality of different programs for growing different types of plants. These programs can vary based the types of plants to be grown, the speed a plant can be grown, and many other variables.

In an embodiment, the grow light system 100 can also be configured to send notices regarding operation of the system 100 and its components such as the air humidity pump 752, external fan 754, temperature adjustment mechanism 756, water pump 758, carbon dioxide pump 760, and nutrient pump 762. In an example, the notices can take the form of an email, a text message, an audible message, and other forms of notices. In an example, the system can email to the user information related to the system 100 such as the spectral light cycle for a particular day, or water usage for a particular day. In an example, the system 100 can email the owner if a problem occurs, such as a low water level or low ambient air temperature level. Similarly, in an example, the system 100 can generate and email a user an end of day report which can include any data logged by the system 100, including for example water usage and light intensity.

In still other examples, the system can send a notice to a SMS email address that could send notices via SMS Text Messaging Services on cell phones. In an example, the system can email warnings like low water warnings or when LEDs are not working properly.

In an embodiment, the grow light system 100 can be configured to receive software updates related to operation of the equipment. In an example, the system can download growing programs for new plants that a user would like to grow. In another example, the system can download information for instruction related to growing techniques. In an example, the system can implement a "parse and stitch" techniques to overcome Wi-Fi/internet connectivity issues, where it can download part of file at a time and when all the parts are downloaded the update can be performed.

In an embodiment, the grow light system 100 can be configured to allow for remote operation of the grow light system 100 and related equipment. A user for example could manually adjust the ambient air temperature through remote access to the temperature adjustment mechanism 756. Similarly, for example, a user could remotely access and change LED operational characteristics, and add water to the growing environment. In such remotely accessible systems, a user could in some embodiments remotely change any variable that the system can modify. In another embodiment, the grow light system 100 can be implemented with an OS based computer system, such as Android and Linux.

Figure 9:
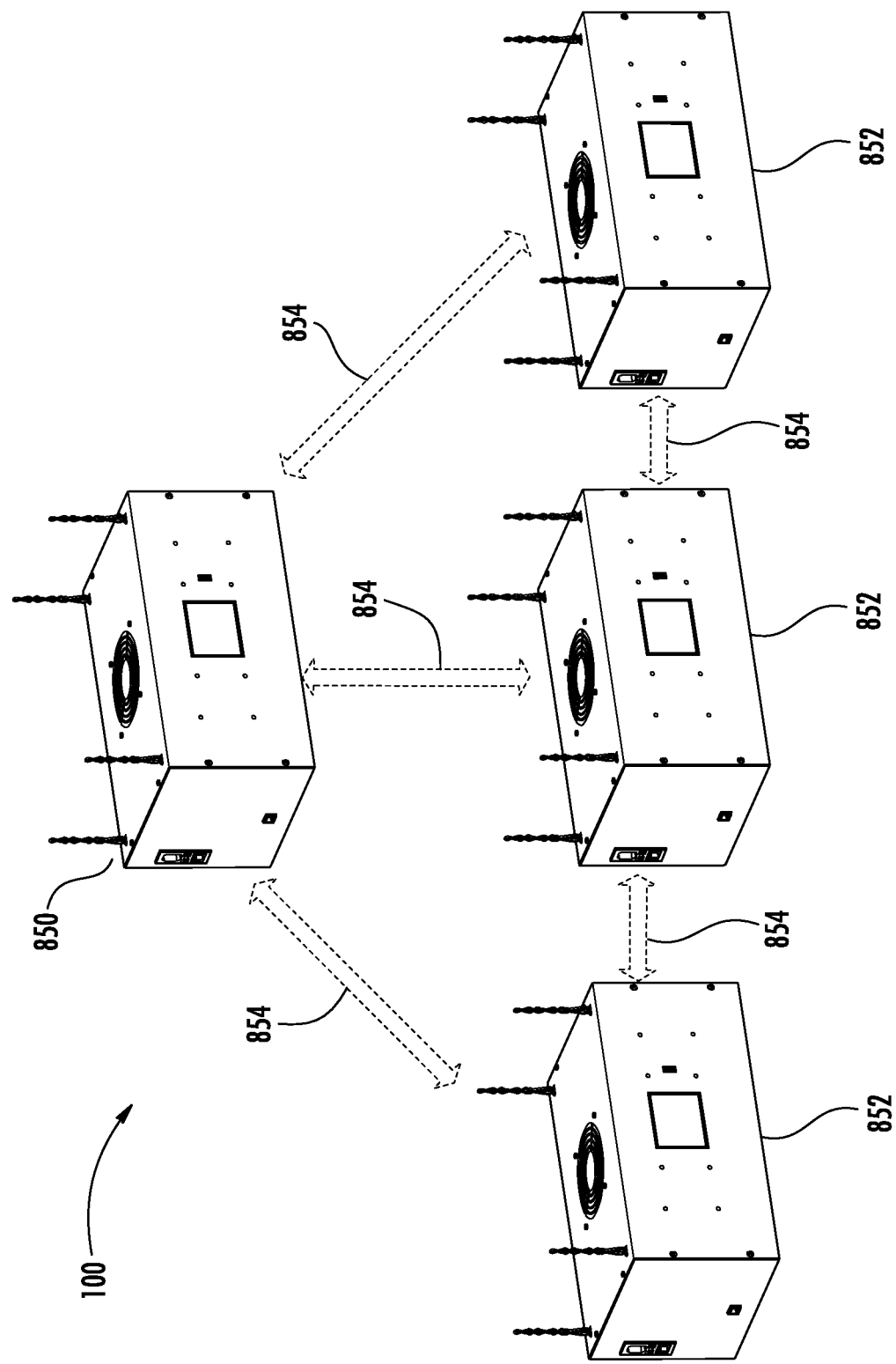
FIG. 9 is an illustrative operating environment in which various aspects of the disclosure may be implemented.

As shown in FIG. 9, in some embodiments the LED growing system 100 can also include a master/drone configuration wherein a master LED growing system 850 can be networked with and control a plurality of drone LED growing systems 852. Both the master and the drone LED systems can have a separate power source or share the power source.

In some embodiments of the LED growing system 100 that have a master/drone configuration, the master unit 850 can have a programmable user interface 112, and the drone units 852 do not have any user interface 112. However, in other embodiments, the drone units can be similar to the master unit and include a user interface 112. The master/drone configurations can incorporate any type of network connection 854 between the units including a wireless connection and/or wired connection between the units, such as RS485 or similar and those discussed herein. The master unit 852 can broadcast commands through the network. Any number of drone units 852 can be connected to the same master unit 850 to create a network of LEDs that can simultaneously execute the same program or different programs to optimize a growing environment. The capabilities of the grow light system 100 with regards to measurement and control of a growing environment can be similar whether it is within a single unit grow light system 100 or a multiple master/drone configuration.

Figure 10A:
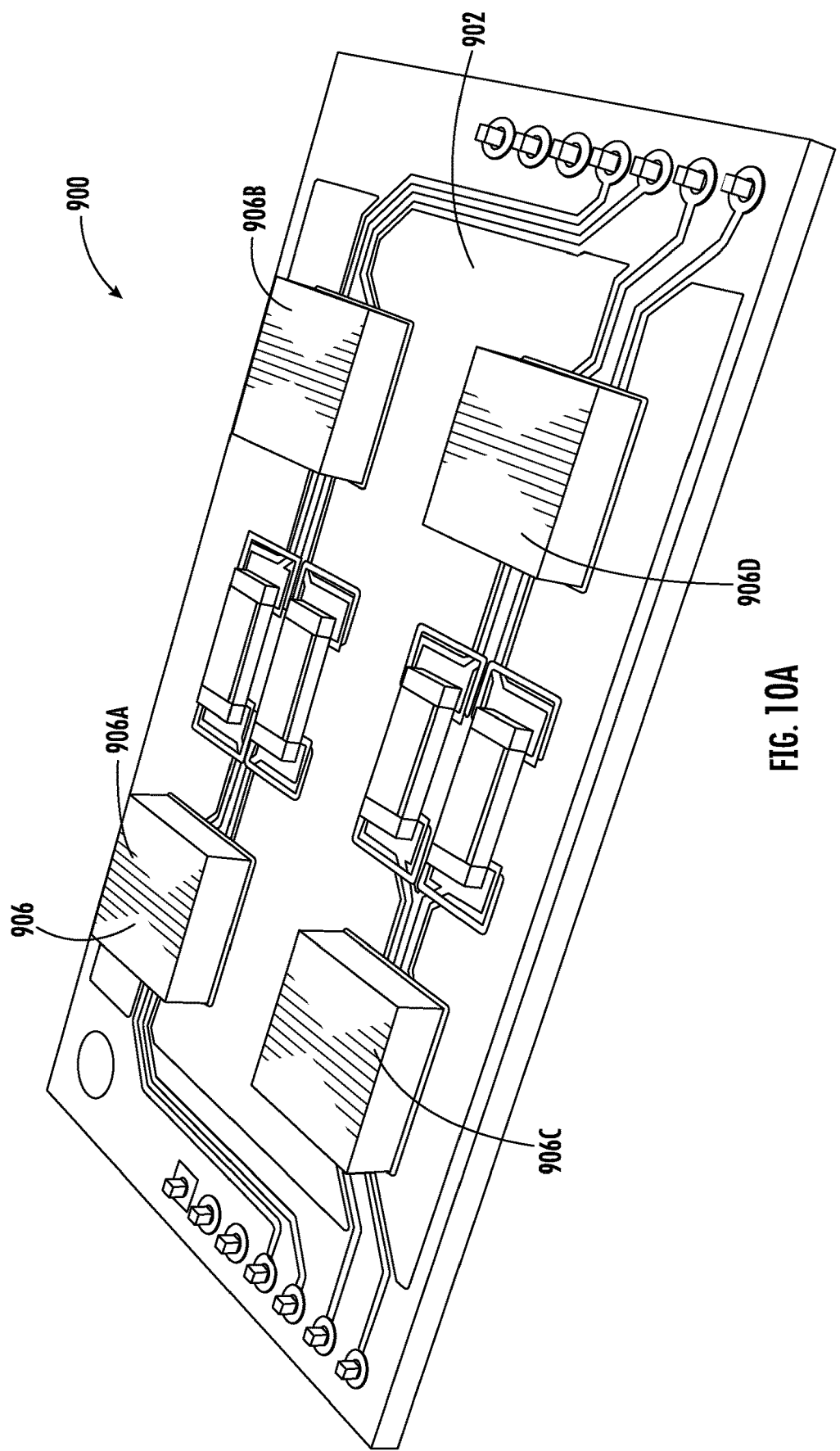
FIG. 10A is a perspective view of another LED module according to aspects of this disclosure
Figure 10B:
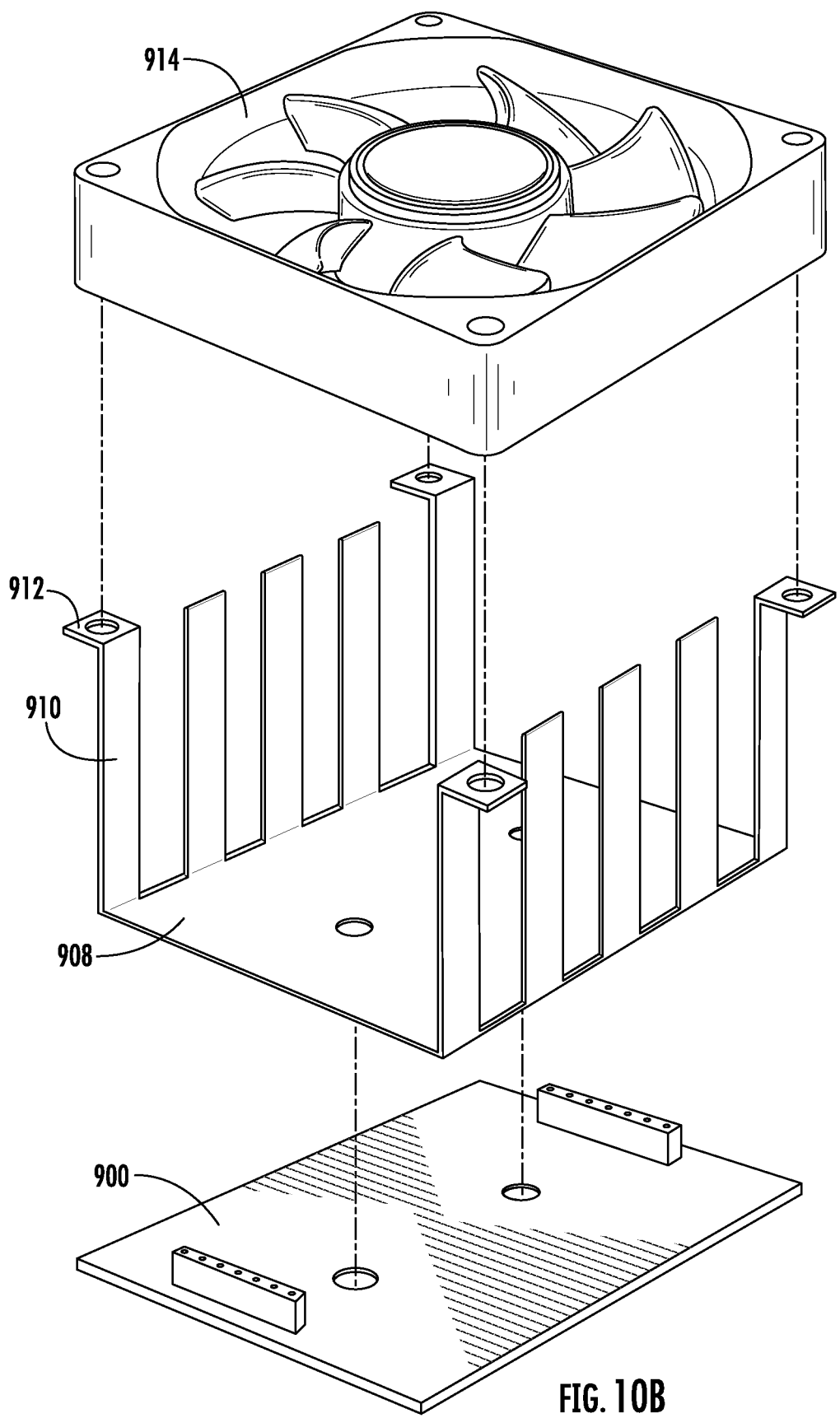
FIG. 10B is an a partially exploded view of another assembled LED module.

As shown in FIG. 10A FIG. 10B, the grow light system may include at least one secondary LED module 900. The secondary LED module 900 includes a circuit panel 902. The circuit panel 902, can be manufactured using any known methods. The circuit panel 902 can include electrical connectors 904, which as will be discussed in more detail below, connect to a carrier board to supply power to the LED module 200.

The secondary LED module 900 also includes a plurality of LEDs 906 electrically connected to the panel 902. As shown in FIG. 10A-FIG. 10B, four LEDs may be attached to the panel 902 of the LED module 900, however, any number of LEDs 906 can be used on the panel 902. For example, in some embodiments, the panel 902 can include in the range of 2 to 10 LEDs 906. Some examples may have more than 10 LEDs 906. The LEDs 906 on any particular secondary LED module 900 can be similar to each other or can be of different brightness (lumens, PAR, etc.), wavelength, and illumination angle to allow the LED module 906 to be customized and adapted easily for multiple different applications or methods.

In some examples, the LEDs 906 of the secondary LED module 900 may comprise chips on board (COB) LEDs. COB LEDs may comprise a plurality of individual LEDs disposed on a substrate. In some examples, each COB LED may comprise 24 individual LEDs disposed on a substrate. A COB LED, for example, may provide increased light output compared to an individual LED. In some examples, the secondary LED module 900 may comprise four LEDs 906. Each LED 906 may comprise a COB LED 906A, 906B, 906C, 906D. In some examples, each LED 906 may be substantially the same and emit substantially the same light. In some examples, The LEDs 906 may emit different wavelengths of light. In some examples, COB LED 906A and COB LED 906B may emit cool white light. In some examples, the cool white light may be rated in color temperatures of 5700K or 6500K. In some examples, COB LED 906C and COB LED 906D may emit warm white light. In some examples, the warm white light may be rated in color temperatures of 2700K or 3000K.

In some examples, a secondary LED module 900 comprise COB LEDs may emit more light than the LED module 200 shown in FIGS. 2-2C. In some examples, the COB LEDs may be 20 watt COB LEDs. In some examples, the COB LEDs may be 72 watt LEDs. High output COB LEDs may be desirable, for example, to emit large quantities of broad spectrum light as compared to the light output of the LEDs 206 of the LED module 200. In some examples, COB LEDs may allow for greatly increased light output and may allow for a 600 watt or higher grow light system 100.

As shown in FIG. 10B, a heat sink 908 may be disposed on the secondary LED module 900. In some examples, the heat sink 908 may be generally U-shaped having plurality of fins 910 that extends away from the secondary LED module 900 and can be generally perpendicular to the secondary LED module 900. The heat sink 908 shown in FIG. 10B comprises four fins 910 on a first side of the heat sink 908 and four fins on a second side of the heat sink 908 and opposite the first side. Although four pairs of heat sink fins 910 is shown in FIG. 10B, the heat sink fins 910 can, for example, comprise any number of U-shaped fins. Although a U-shaped fin is shown, other heat sink fin shapes can be used. In some examples, the heat sink fins 910 may comprise tabs 912 on the end of the heat sink fin 910. In some examples, the tabs 912 may have one or more holes. The holes may be used, for example, to attach a fan 914 to the tabs 912 of the heat sink 908. The fan 914, for example, may comprise a 30 mm fan assembly. The heat sink fin 910 may include other features, such as tabs, holes, or other elements, on the fin that may increase heat dissipation. In some examples the heat sink 908 may be manufactured of aluminum or aluminum alloys, and other materials can include copper, composite materials, and other good heat conducting materials.

Figure 11:
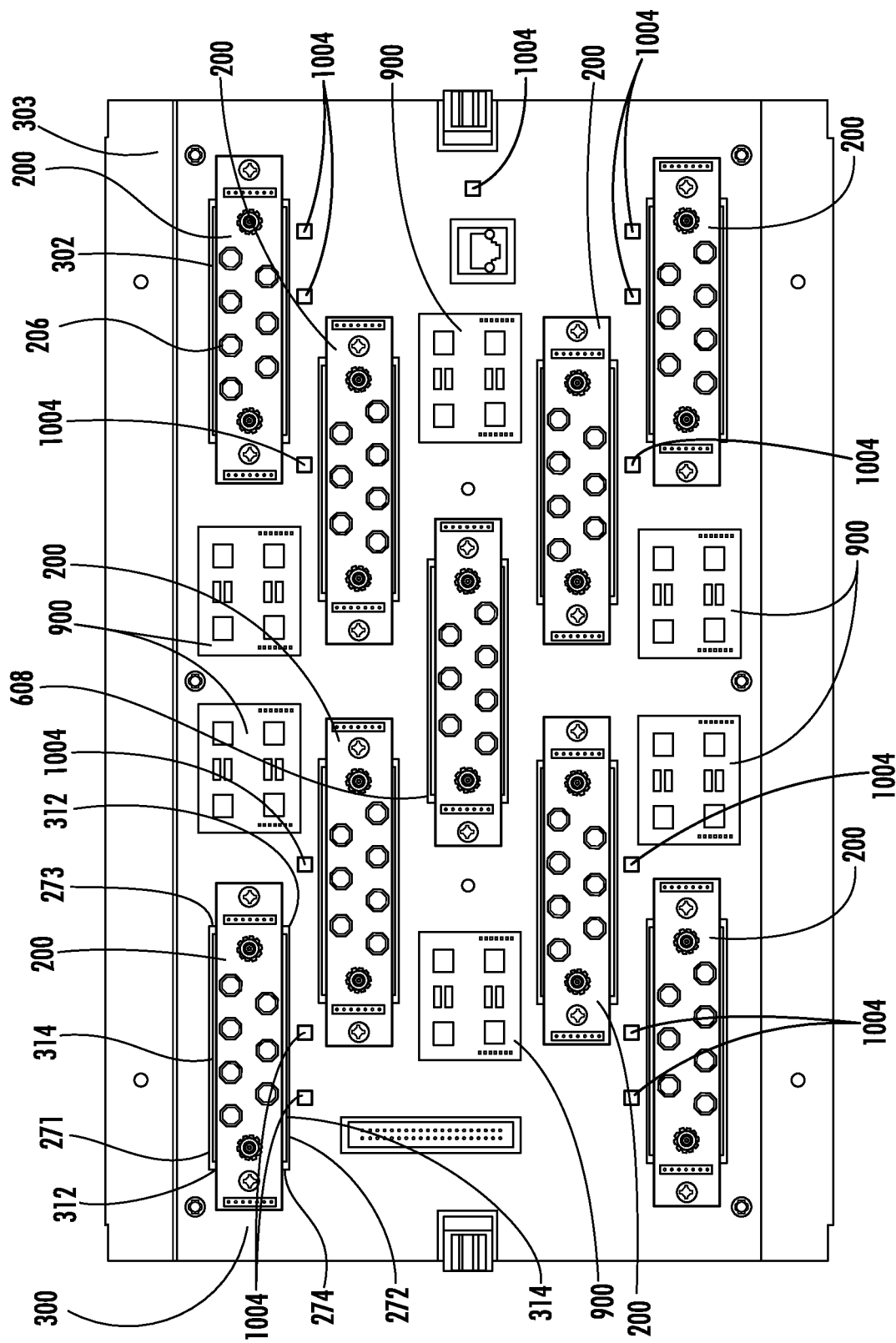
FIG. 11 is a bottom view of another carrier board assembly including LED modules

As shown in in FIG. 11, depicting an example carrier board assembly 300, the carrier board assembly 300 may include, for example, nine generally rectangular apertures 302 to house nine LED modules 200 and six generally rectangular secondary apertures 1002 to house six secondary LED modules 900. In some examples, the carrier board assembly 300 may comprise more or less than six secondary apertures 1002. The carrier board assembly 300 shown in FIG. 11 may be similar to and may comprise similar features to the carrier board assembly shown in FIG. 4. In some examples, the carrier board assembly 300 may comprise electrical connectors associated with each secondary aperture 1002 and configured to connect to electrical connectors associated with the secondary LED modules 900. The secondary LED module 900, similar to the LED module 200, may be a modular design, and may be individually installed into and/or removed from the carrier board assembly 300. The modular design may allow for replacement of individual LED modules 200 and secondary LED modules 900 with LED modules 200 and secondary LED modules 900 having LEDs configured to emit different wavelengths and/or intensities of light and/or different combinations of wavelengths and/or intensities of light.

In some examples, carrier board assembly 300 may comprise electrical connectors for interfacing with the electrical connectors of the LED modules 200 to provide power to the LED modules 200. In some examples, electrical connectors may be configured such that the LED modules 200 may connect to the carrier board assembly in a single orientation. In some examples, electrical connectors associated with neighboring and/or opposite LED modules 200 may be configured such that the neighboring and/or opposite LED modules 200 may be in mirrored orientations relative to each other (e.g., neighboring and/or opposite LED modules 200 may be mounted in a 180 degree rotation relative to each other). The mirrored orientation may, for example, provide optimal (e.g., uniform) plant light coverage. In some examples, the apertures 302 may form a generally X-shaped layout. The generally X-shaped layout may be conducive to growing plants. In some examples, more than one carrier board assembly 300 may be used. In examples where more than one carrier board assembly 300 is used, the apertures 302 forming a generally x-shaped layout on each carrier board assembly 300 may form a generally diamond-shape layout. For example, the neighboring x-shaped layout of multiple carrier board assemblies 300 may form a diamond shape between the neighboring x-shapes. The diamond shape created by multiple carrier board assemblies 300 may, for example, provide a broader and/or more uniform coverage of light than other layouts. In some examples, however the carrier board assembly 300 can be configured in different sizes and shapes with different layouts of LED modules 200 to provide for optimal plant light coverage.

In some embodiments the secondary LED modules 900 can be spaced from the face 303 of the carrier board 300 using a spacer. The spacer can be formed of any material and in some embodiments can be formed of a nonconductive material such as plastic. The spacer can be about 0.25 inches high or in the range 0.125 inches to about 0.5 inches. In other embodiments, the secondary LED modules 900 can be spaced from the face 303 of the carrier board assembly 300 without the use of a spacer.

Like the carrier board 300 and the LED module 200, the space between the face 303 of the carrier board 300 and the back of the secondary LED module 900 can define a vertical gap. The apertures of the carrier board are sized to be slightly larger than the heat sink 908 forming additional gaps between the carrier board assembly 300 and the heat sink 908. For example, in the longitudinal direction, or length of the secondary LED module 900, there can be a longitudinal gap on either side of the heat sink 908 of approximately 0.0125 inches or in the range of about 0.00625 inches to about 0.25 inches. Similarly, in the lateral direction, or width of the secondary LED module 900, there can be a lateral gap 314 on either side of the heat sink 908 of approximately 0.00625 inches or in the range of about 0.003125 inches to about 0.25 inches. The fan 914 may pull or push air through the lateral gap to cool the heat sink 908 and/or secondary LED module 900.

In some examples, one or more UV LEDs 1004 may be disposed on the carrier board assembly 300. The UV LEDs 1004 may emit, for example, UVA light. In some examples, the UVA LEDs 1004 may emit light having a wavelength of about 362 nm-370 nm. In some examples, UVA LEDs 1004 may emit light having a wavelength of 420 nm. In some examples, UVA LEDs 1004 may emit light having a wavelength of about 315 nm-400 nm. In some examples, the UVA LEDs 1004 may be wired in series on the carrier board assembly 300. In some examples, the UVA LEDs 1004 may be wired in series with an LED configured to emit visible light. UV light may not be visible to the human eye, and the LED configured to emit visible light wired in series with the UVA LEDs 1004 may provide a visible indication that the UVA LEDs 1004 are turned on and/or are emitting UV light. In some examples, LEDs configured to emit non-UV wavelengths may be disposed on the carrier board assembly 300 in addition to or instead of the UV LEDs 1004.

In some examples, the grow light system 100 can also include LED Drivers to control LED circuits associated with the secondary LED modules 900. As described above, each secondary LED module 900 can include a plurality of LEDs 906 (represented as 906A, 906B, 906C, and 906D in FIG. 10A). Each LED 906 corresponding to the same location on a particular secondary LED module 900 can be wired in a combination of series and/or parallel with the other corresponding LEDs 906 of the other secondary LED modules 900. In some examples, LEDs having the same wavelength, color, or a number of other variables can be wired in series. In some examples, LEDs having the same wavelength, color, or a number of other variables can be wired in parallel. For example, as shown in FIG. 10A, each of the LEDs 906 represented as 906A can be wired in series with each other, each of the LEDs 906 represented as 906B can be wired in series with each other, each of the LEDs 906 represented as 906C can be wired in series with each other, and each of the LEDs 906 represented as 906D can be wired in series with each other. In some examples, two LEDs on the same secondary LED modules 900 may be wired in series with each other and/or in series with the other corresponding LEDs 906 of the other secondary LED modules 900. For example, each of the LEDs 906 represented as 906A and 906B can be wired in series with each other, and each of the LEDs 906 represented as 906C and 906D can be wired in series with each other. For example, all LEDs 906 represented 906A or 906B may emit warm white light, and all LEDs 906 represented 906C or 906D may emit cool white light. As will be discussed in more detail below, this allows a user to vary the intensity of the warm white and cool white LEDs independently. Thus, for example, a user could increase the intensity of the 906A and 906B LEDs and/or decrease the intensity of the 906C and 906D LEDs. The secondary LED module 900 shown in FIG. in FIG. 11 comprises four LEDs 906. However, the secondary LED module 900 may comprise any number of LEDs 906. The secondary LED modules 900 and LEDs 906 comprised by the secondary LED modules 900 may be wired in any combination of series or parallel. In some examples, where the LEDs 906 comprise COB LEDs, the plurality of individual LEDs of the COB LED may be wired in any combination of series and/or parallel.

Figure 12:
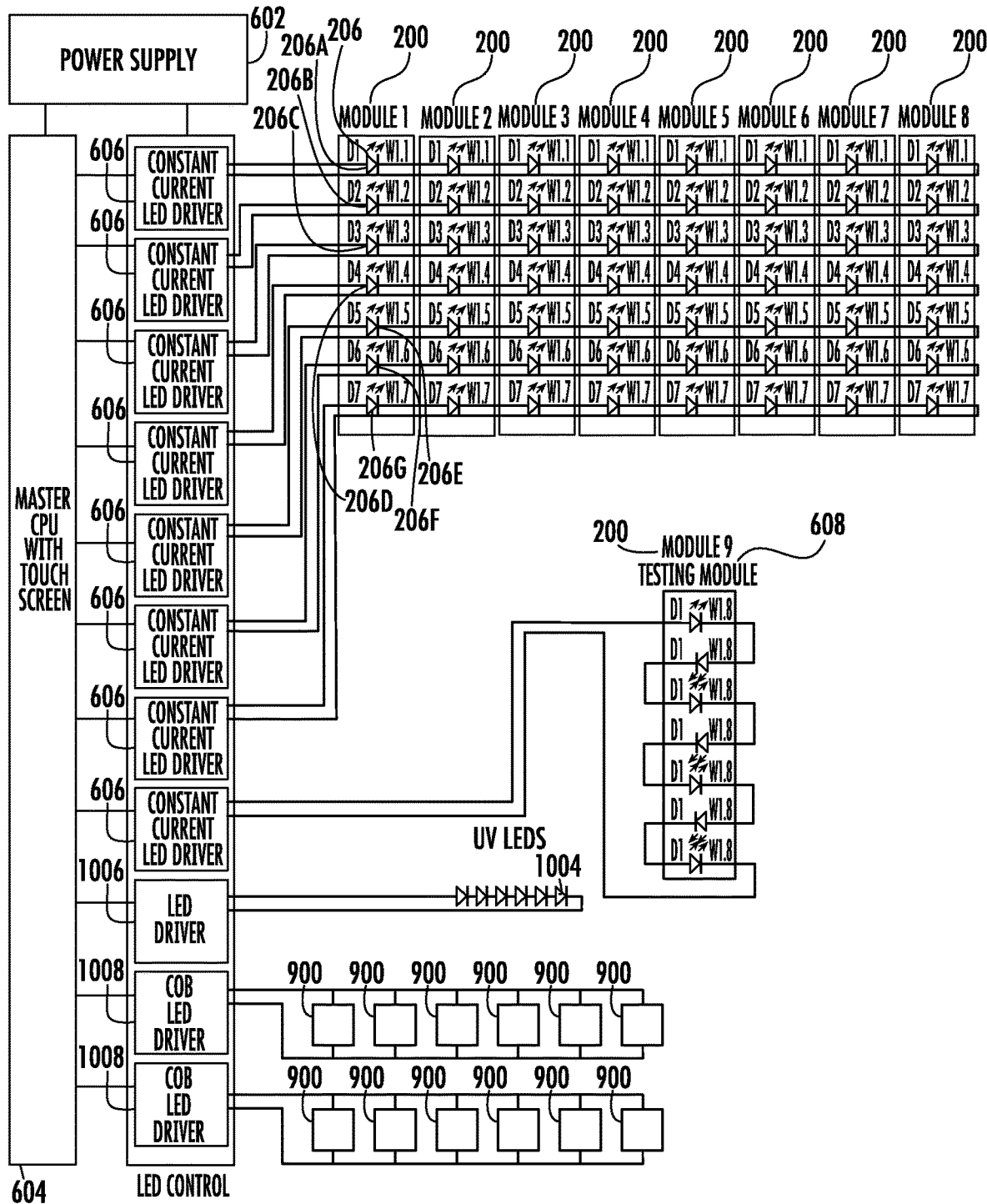
FIG. 12 is a wiring diagram of an LED lighting system according to aspects of this disclosure.

FIG. 12 shows an example circuit diagram representing the grow light system 100. The grow light system includes a power supply 602 for providing power to the grow light system and includes a master CPU 604 for controlling the grow light system 100. The grow light system 100 can also include LED Drivers 606, LED Driver 1006, and/or COB LED drivers 1008 to control the LED circuits. As described above, each LED module 200 can include a plurality of LEDs 206 (represented as D1 (206A), D2 (206B), D3 (206C), D4 (206D), D5 (206E), D6 (206F), and D7 (206G) in FIG. 12). As shown in FIG. 12, each LED 206 corresponding to the same location on a particular LED module 200 can be wired in series with the other corresponding LEDs 206 of the other LED modules 200. In other embodiments, LEDs having the same wavelength, color, or a number of other variables can be wired in series together. Additionally, each of the LEDs 206 represented by D1 (206A) are connected to a single LED driver 606, each of the LEDs represented by D2 (206B) are connected to a different LED driver 606, and so on. Wiring the LEDs in series can provide significant advantages to a user, and allow a user to vary the intensity of each of the D1 (206A), D2 (206B), D3 (206C), D4 (206D), D5 (206E), D6 (206F), and D7 (206G) LEDs independently. Thus, for example, a user could increase the intensity of the D1 LEDs (206A) and/or decrease the intensity of the D2 LEDs (206B).

As shown in FIG. 12, in addition to wiring the LEDs 206 of the grow light system 100 in series, the grow light system 100 can include one LED module 200 that is not wired in series like the other LED modules 200. This LED module 200 can be the same or similar to the other LED modules 200 and it can differ in that it is electrically connected through the carrier circuit board assembly 300 differently than the other LED modules 200. The carrier circuit board assembly 300 can include one LED module 200 location that can be designated the test location 608. This test location 608 as shown in FIG. 12 is not wired in series like the other LED modules 200 and can allow a user to individually test a LED module 200 for operability.

In some examples, the grow light system 100 may comprise LED Driver 1006. The LED Driver 1006 may, for example, control the UV LEDs 1004. In some examples, the UV LEDs 1004 may be wired to the LED driver 1006 in series with each other. In some examples, the UV LEDs 1004 may be wired to the LED driver 1006 in parallel with each other. In some examples, the UV LEDs 1004 may be wired to the LED driver 1006 in a combination of series and/or parallel. This may, for example, allow a user to adjust the intensity of the UV LEDs 1004 together or individually based on the desired combination or series and/or parallel wiring.

In some examples, the grow light system 1000 may comprise one or more COB LED driver 1008. The COB LED driver 1008 may, for example, control the secondary LED module(s) 900. In some examples, the LED modules 900 connected to a single COB LED driver 1008 may be wired in series with each other. In some examples, the LED modules 900 connected to a single COB LED driver 1008 may be wired in parallel with each other. In some examples, the secondary LED modules 900 may be wired to the COB LED driver 1008 in any combination of series and or parallel wiring. This may, for example, allow a user to adjust the intensity of the secondary LED modules 900 and associated LEDs 906 together or individually based on the desired combination or series and/or parallel wiring. While FIG. 12 shows two COB LED drivers 1008, with each COB LED driver connected to six secondary LED modules 900, any number of COB LED drivers and secondary LED modules 900 may be used.

In some examples, the grow light system 100 may include LED Drivers 606 to control the LED circuits. The grow light system 100 may comprise, for example, twelve LED circuits. As shown in FIG. 12, seven circuits may be used for each LED 206A, 206B, 206C, etc. of the LED module 200 wired in series with each other, and one circuit may be used for the testing module 608. In some examples, two circuits may be used for the secondary LED modules 900. In some examples, two LEDs 906 on the secondary LED modules 900 would be associated with a first circuit and two different LEDs 906 on the secondary LED modules 900 with a second circuit. For example, each cool white LED on the secondary LED modules 900 may be associated with the first circuit, and each warm white LED on the secondary LED modules 900 may be associated with the second circuit. In some examples, two circuits may be associated with the UV LEDs 1004 disposed on the carrier board assembly 300. In some examples, 420 nm UV LEDs 1004 disposed on the carrier board assembly 300 may be wired in series on one circuit and 362 nm-370 nm UV LEDs 1004 disposed on the carrier board assembly 300 may be wired in series in a different circuit. In Some examples, the UV LEDs 1004 may be wired in series with an LED configured to emit visible light. The UV LEDs 1004 may be wired in series with an LED configured to emit visible light, for example, to indicate to a user than the UV LEDs 1004 are operating. In some examples, the grow light system 100 may comprise more or less than 12 circuits as necessary depending on the desired number and type of LEDs. In some examples, each of the 12 circuits may be controlled separately to individually adjust the LEDs associated with each circuit.

As discussed above, in some examples, the grow light system 100 can include programs for growing plants, for example, via a controller. In some examples, a user may be able to use the input/output module 704 to create programs for growing plants. For example, input/output module 704 may comprise a plurality of buttons associated with different growing programs, such as, for example, physical buttons and/or virtual buttons on a touch screen. In some examples, the grow light system 100 may comprise 7 physical or touch screen buttons, each associated with a different program. Some examples may comprise more or less than 7 buttons. The user may, for example, select a button to associate with a customized growing program. The grow light system 100 may allow the user to input a name to be associated with the chosen button/program. In some examples, the user may adjust the wavelengths of light emitted for the program. For example, each of the 12 circuits may be adjusted individually by the user. The user, for example, may adjust each circuit between 0% and 100% of the maximum emission associated with each circuit.

The user may individually adjust, for example, the amount of far red light (720 nm-740 nm), photo red light (650-670 nm), dark red light (660 nm-665 nm), red light (620 nm-630 nm), red-orange light (610 nm-620 nm), amber light (585 nm-595 nm), green light (520 nm-550 nm), cyan light (490 nm-520 nm), blue light (465 nm-485 nm), dark blue light (455 nm-460 nm), royal blue light (450 nm-465 nm), warm white light, cool white light LEDs, and UV light emitted by the grow light system 100. Each type of light, for example, may be associated with a different channel and output of each type of light may be individually adjusted by the user. In some examples, the user may adjust the amount of time each type/wavelength of light is emitted. For example, the user may create a program to emit cool white light and amber light for 12 hours, followed by UV light for 1 hour, followed by turning off the lights for 11 hours before repeating the program. For an example grow light system 100 comprising 12 channels, the grow light system 100 may be able to create growing programs comprising up to 12 different wavelength ranges at varying emission times and intensities.

In some examples, the user may create multiple programs. In examples with 7 buttons, each button associated with a different program. Each button may be associated with, for example, a seedling stage, vegetative stage, pre-flowering stage, early flowering stage, late flowering stage, and harvest stage. Each program may be pre-programmed, may be downloaded, and/or may be adjusted by the user. For example, a flowering stage program may be programmed to emit wavelengths associated with red and UV light and may not emit cool white light or warm white light that may be desirable for other programs. In some examples, the grow light system 100 may automatically switch between programs, for example, based on the time of year and/or growth stage of the plants. As discussed above, the I/O module 704 may receive inputs from at least the sensors 708, 710, 712, 714, 716, 718, 720, 721, 722, 724. The grow light system 100 may adjust the programs and/or switch between programs based on the sensors 708, 710, 712, 714, 716, 718, 720, 721, 722, 724.

In some examples, a growing program may simulate sunrise and/or sunset. For example, the wavelengths and/or intensity of light emitted by the grow light system 100 may adjust over time to simulate the wavelengths and/or intensity of light emitted by the sun during sunrise and/or sunset. For example, the wavelengths may change as the total intensity of light increases over time to simulate sunrise and the wavelengths may change as the total intensity of light decreases to simulate sunset. In some examples, the programs may adjust the amount of time light is emitted. For example, light may be on for 12 hours and off for 12 hours. In some examples, the grow light system 100 may emulate shorter days by decreasing the length of time the light is on. Some plants, for example, may react differently based on the day length. In some examples, a growing program may emulate daylight, for example, by increasing light intensity and adjusting light wavelengths to emulate the intensity and wavelengths of the sun moving higher into the sky towards noon, then decreasing the light intensity and adjusting the wavelengths to emulate the sun moving lower into the sky towards sunset.

While some examples may use the touch screen to allow the user to create growing programs, some examples may allow the user to create growing programs externally. For example, a growing program may be created via a cell phone application or computer program and uploaded to the grow light system 100. For example, an application or program may provide an x-y graph of time and wavelength to allow a user to adjust each individual channel associated with a different wavelength over time. For example, the user could draw/drag a line associated with each channel in the x-y graph to adjust the intensity of the wavelengths associated with each channel.

In some examples, the touch screen, cell phone application, computer program, or other programming method may allow a user to create the growing program step by step. For example, while creating the growing program, a user may be prompted to select the intensity of each channel and associated wavelengths of light one step at a time. For example, if red light is associated with channel 1, the user may input a light intensity, input a percentage of total possible light intensity, or drag a column to adjust the intensity for channel 1. After inputting the intensity for channel 1, the grow light system 100 may proceed to channel 2 and ask the user to input the desired intensity for channel 2. The grow light system 100 may proceed through each channel and request user input of the intensity associated with each channel associated with the grow light system 100. In addition to intensity, the user, in some examples, may adjust the timing of each channel.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. In addition, where reference has been made in this disclosure to items in the figures, in some instances a reference number has been omitted when it is desired to generally reference the item without specificity as to which of the plurality of items corresponding to the same base reference number.

The invention claimed is:

1. A grow light system comprising:
   a carrier board assembly defining a plurality of first light emitting diode (LED) module apertures, a plurality of second LED module apertures, and an LED testing module aperture;
   a plurality of first LED modules removably engaged with the carrier board assembly in the plurality of first LED module apertures and in the LED testing module aperture; and
   a plurality of second LED modules removably engaged with the carrier board assembly in the plurality of second LED module apertures;
   wherein each of the plurality of first LED modules comprises a first LED and a second LED;
   wherein the first LEDs of the plurality of first LED modules engaged in the plurality of first LED module apertures are wired in series with each other;
   wherein the second LEDs of the plurality of first LED modules engaged in the plurality of first LED module apertures are wired in series with each other; and
   wherein the first LED and the second LED of the first LED module engaged in the LED testing module aperture are wired in series with each other.

2. The grow light system of claim 1 wherein each of the first LEDs have a first wavelength and each of the second LEDs have a second wavelength different from the first wavelength.

3. The grow light system of claim 1 wherein:
each of the plurality of second LED modules comprises a third LED and a fourth LED;
the third LEDs of the plurality of second LED modules engaged in the plurality of second LED module apertures are wired in series with each other; and
the fourth LEDs of the plurality of second LED modules engaged in the plurality of second LED module apertures are wired in series with each other.

4. The grow light system of claim 1 wherein the second LED modules each comprise one or more chips on board (COB) LEDs.

5. The grow light system of claim 1, further comprising a plurality of third LEDs disposed on the carrier board assembly and configured to emit ultraviolet light.

6. The grow light system of claim 1, wherein each of the plurality of second LED modules comprises a heat sink and a fan.

7. The grow light system of claim 1, further comprising a controller configured to adjust wavelengths of light emitted by the first LED modules or the second LED modules.

8. A grow light system comprising:
a housing;
a carrier board assembly defining a plurality of first light emitting diode (LED) module apertures, a plurality of second LED module apertures, and an LED testing module aperture;
a plurality of first LED modules removably engaged with the carrier board assembly in the plurality of first LED module apertures and in the LED testing module aperture; and
a plurality of second LED modules removably engaged with the carrier board assembly in the plurality of second LED module apertures;
wherein each of the plurality of first LED modules comprises a first LED and a second LED;
wherein the first LED modules are configured to emit a first light having a first wavelength;
wherein the second LED modules are configured to emit a second light having a second wavelength;
wherein the first LEDs of the plurality of first LED modules engaged in the plurality of first LED module apertures are wired in series with each other;
wherein the second LEDs of the plurality of first LED modules engaged in the plurality of first LED module apertures are wired in series with each other;
wherein the first LED and the second LED of the first LED module engaged in the LED testing module aperture are wired in series with each other; and
a controller configured to adjust a wavelength spectrum of light emitted by the plurality of first LED modules or second LED modules.

9. The grow light system of claim 8, further comprising a plurality of sensors connected to the controller and configured to monitor operation of a growing environment.

10. The grow light system of claim 8, wherein the second LED module comprises a third LED configured to emit a first light having a color temperature of 2,000-4,000 K and a fourth LED configured to emit a second light having a color temperature of 5,000-10,000 K.

11. The grow light system of claim 8, further comprising a plurality of third LEDs disposed on the carrier board assembly and configured to emit ultraviolet light.

12. The grow light system of claim 11, wherein the ultraviolet light comprises 362-370 nanometer (nm) light.

13. The grow light system of claim 8, wherein:
each of the plurality of second LED modules comprises a heat sink and a fan;
the heat sink comprises a U-Shape; and
the fan is mounted to the heat sink and configured to draw air along the heat sink.

14. A grow light system comprising:
a carrier board assembly defining a plurality of first light emitting diode (LED) module apertures a plurality of second LED module apertures, and an LED testing module aperture; a plurality of first LED modules removably engaged with the carrier board assembly in the plurality of first LED module apertures; wherein each of the plurality of first LED modules comprises a first LED and a second LED; wherein the first LEDs of the plurality of first LED modules engaged in the plurality of first LED module apertures are wired in series with each other; wherein the second LEDs of the plurality of first LED modules engaged in the plurality of first LED module apertures are wired in series with each other; a plurality of second LED modules removably engaged with the carrier board assembly in the plurality of second LED module apertures; wherein each of the plurality of second LED modules comprises a third LED and a fourth LED;
wherein the third LEDs of the plurality of second LED modules engaged in the plurality of second LED module apertures are wired in series with each other; wherein the fourth LEDs of the plurality of second LED modules engaged in the plurality of second LED module apertures are wired in series with each other; an LED testing module engaged in the LED testing module aperture, wherein a first LED and a second LED of the LED testing module are wired in series with each other; and a plurality of fifth LEDs disposed on the carrier board assembly and wired in series with each other.

15. The grow light system of claim 14, wherein:
the first LEDs are wired in series through a first circuit on the carrier board;
the second LEDs are wired in series through a second circuit on the carrier board;
the third LED are wired in series through a third circuit on the carrier board;
the fourth LED are wired in series through a fourth circuit on the carrier board;
the fifth LED are wired in series through a fifth circuit on the carrier board; and
the grow light system further comprises a controller configured to individually control the first circuit, second circuit, third circuit, fourth, circuit, or fifth circuit.

16. The grow light system of claim 15, wherein:
the first LEDs, second LEDs, third LEDs, fourth LEDs, and fifth LEDs are configured to emit light having wavelengths different from each other.

17. The grow light system of claim 15, wherein the controller is further configured to control the first circuit, second circuit, third circuit, fourth, circuit, and fifth circuit based on a growing program.

18. The grow light system of claim 17, wherein:
the first LEDs, second LEDs, third LEDs, fourth LEDs, and fifth LEDs are configured to emit light having wavelengths different from each other; and the growing program is configured to emit, via the first LEDs, second LEDs, third LEDs, fourth LEDs, and fifth LEDs, light having different wavelengths at different times.

19. The grow light system of claim 14, further comprising:
a controller;
wherein the controller comprises a touch screen configured to accept user input;
wherein the controller is configured create, based on the user input, a growing program;
wherein the growing program is configured to adjust, via the controller, an intensity of light emitted by the first LEDs, second LEDs, third LEDs, fourth LEDs, or fifth LEDs.

20. The grow light system of claim 14, wherein:
the first LEDs are configured to emit a first light having a wavelength of 450-740 nanometers (nm);
the second LEDs are configured to emit a second light having a wavelength of 450-740 nm and different from the wavelength of the first LEDs;
the third LEDs are configured to emit a third light having a color temperature of 2,000-4,000 K;
the fourth LEDs are configured to emit a fourth light having a color temperature of 5,000-10,000 K; and
the fifth LEDs are configured to emit a fifth light having a wavelength of 315-400 nanometers.

* * * * *